US008941865B2

(12) United States Patent
Sakai

(10) Patent No.: US 8,941,865 B2
(45) Date of Patent: Jan. 27, 2015

(54) PRINT SYSTEM AND IMAGE FORMING APPARATUS FOR SETTING A TRANSITION STANDBY PERIOD

(75) Inventor: Hiroshi Sakai, Sakai (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 224 days.

(21) Appl. No.: 13/367,493

(22) Filed: Feb. 7, 2012

(65) Prior Publication Data

US 2012/0212778 A1 Aug. 23, 2012

(30) Foreign Application Priority Data

Feb. 18, 2011 (JP) ................................ 2011-033522

(51) Int. Cl.
*G06F 3/12* (2006.01)
*G06K 15/00* (2006.01)

(52) U.S. Cl.
CPC .......... *G06K 15/4055* (2013.01); *G06K 15/402* (2013.01); *G06F 3/1214* (2013.01); *G06F 3/1221* (2013.01); *G06F 3/1262* (2013.01); *G06F 3/1288* (2013.01); *Y02B 60/1267* (2013.01)
USPC ........................... 358/1.15; 358/413; 358/437

(58) Field of Classification Search
CPC ........ G06F 1/32; G06F 1/3203; G06F 1/3284
USPC ................................. 358/1.1–3.29
See application file for complete search history.

(56) References Cited

U.S. PATENT DOCUMENTS

2006/0007469 A1* 1/2006 Uruma ........................ 358/1.14
2006/0265473 A1* 11/2006 Muto ............................ 709/218

(Continued)

FOREIGN PATENT DOCUMENTS

| CN | 1833214 A | 9/2006 |
|---|---|---|
| JP | 05-155035 A | 6/1993 |
| JP | 6-270512 A | 9/1994 |

(Continued)

OTHER PUBLICATIONS

Abstract provided by applicant in IDS filed on Sep. 5, 2014 JP07-219391, Aug. 18, 1995, Ueno Fumihiro.*
Abstract provided by Applicant in IDS Filed on Sep. 5, 2014 JP05-155035, Jun. 22, 1993, Sugawara Tatsuo.*

(Continued)

*Primary Examiner* — Benny Q Tieu
*Assistant Examiner* — Marcellus Augustin
(74) *Attorney, Agent, or Firm* — Buchanan Ingersoll & Rooney PC

(57) ABSTRACT

A print system comprises notification part for providing, to a user, a notification of an inquiry about whether concurrent printing output that an image forming apparatus performs first printing output and subsequently performs second printing output is scheduled, in a non-sleep period associated with the first printing output by the image forming apparatus; and setting part for setting a transition standby period for transition of the image forming apparatus to a sleep state at a first value when a reply for informing that the concurrent printing output is scheduled is not sent from the user, and setting the transition standby period at a second value which is larger than the first value when the reply is sent from the user.

14 Claims, 23 Drawing Sheets

(56) References Cited

U.S. PATENT DOCUMENTS

| | | | |
|---|---|---|---|
| 2006/0266547 A1* | 11/2006 | Koga | 174/255 |
| 2008/0028241 A1* | 1/2008 | Tamasaki | 713/310 |
| 2008/0297837 A1* | 12/2008 | Soda | 358/1.15 |
| 2009/0316178 A1 | 12/2009 | Tanaka | |

FOREIGN PATENT DOCUMENTS

| | | |
|---|---|---|
| JP | 07-219391 A | 8/1995 |
| JP | 2002-163091 A | 6/2002 |
| JP | 2006-129689 A | 5/2006 |
| JP | 2008-300914 A | 12/2008 |
| JP | 2009-116818 A | 5/2009 |
| JP | 2009-178855 A | 8/2009 |
| JP | 2010-4150 A | 1/2010 |

OTHER PUBLICATIONS

Japanese Office Action (Notification of Reasons for Rejection) issued on May 21, 2013, by the Japanese Patent Office in corresponding Japanese Patent Application No. 2011-033522, and an English Translation of the Office Action. (13 pages).

Office Action (Examiner's Decision to Grant a Patent) issued on Mar. 11, 2014, by the Japan Patent Office in corresponding Japanese Patent Application No. 2011-033522, and an English Translation of the Office Action. (6 pages).

Office Action (First Notice of the Opinion on Examination) issued on Jun. 5, 2014, by the State Intellectual Property Office of the People's Republic of China (SIPO) in corresponding Chinese Patent Application No. 201210032919.X, and an English Translation of the Office Action. (26 pages).

* cited by examiner

PRINTING IS NOW BEING PERFORMED IN MFP NO. 1.

THE PRINTING PROCESSING WILL BE COMPLETED IN FIVE MINUTES.

WILL YOU CONTINUOUSLY PERFORM PRINTING WITH MFP NO.1 DURING OPERATION OF THE SAME MACHINE?

WHEN PERFORMING PRINTING, PLEASE SEND BACK AS FOLLOWS.
...

<USE FREQUENCIES OF APPARATUSES BY USER UB>

| APPARATUS NO. | USE FREQUENCY (NO. OF TIMES/ PREDETERMINED PERIOD) |
|---|---|
| NO. 1 (MFP 10a) | 100 |
| NO. 2 (MFP 10b) | 94 |
| NO. 3 (MFP 10c) | 30 |
| NO. 4 (MFP 10d) | 10 |
| NO. 5 (MFP 10e) | 1 |

<USE FREQUENCIES OF APPARATUSES BY USER UC>

| APPARATUS NO. | USE FREQUENCY (NO. OF TIMES/ PREDETERMINED PERIOD) |
|---|---|
| NO. 1 (MFP 10a) | 2 |
| NO. 2 (MFP 10b) | 150 |
| NO. 3 (MFP 10c) | 40 |
| NO. 4 (MFP 10d) | 84 |
| NO. 5 (MFP 10e) | 120 |

<DESIGNATED APPARATUS FOR EACH PRINT TYPE BY USER UB>

| PRINT TYPE | APPARATUS NO. |
|---|---|
| COLOR | NO. 1 (MFP 10a) |
| MONOCHROME | NO. 2 (MFP 10b) |

| ENTRY DOOR NO. | APPARATUS NO. |
|---|---|
| "FIRST DOOR" (DOOR DR1) | NO. 1 (MFP 10a) |
| | NO. 2 (MFP 10b) |
| | NO. 3 (MFP 10c) |
| | NO. 4 (MFP 10d) |
| "SECOND DOOR" (DOOR DR2) | NO. 5 (MFP 10e) |
| | NO. 6 (MFP 10f) |
| "THIRD DOOR" (DOOR DR3) | NO. 7 (MFP 10g) |

PRINT SYSTEM AND IMAGE FORMING APPARATUS FOR SETTING A TRANSITION STANDBY PERIOD

This application is based on Japanese Patent Application No. 2011-033522 filed on Feb. 18, 2011, the contents of which are hereby incorporated by reference.

BACKGROUND OF THE INVENTION

1. Field of the Invention

The present invention relates to image forming apparatuses such as MFPs (Multi-Functional Peripherals), and a print system utilizing the image forming apparatus.

2. Description of the Background Art

In image forming apparatuses such as MFPs (Multi-Functional Peripherals), in order to reduce unnecessary power consumption on standby, a sleep mode is provided in which after a predetermined non-operation period has passed, power supply to a fuser and the like inside the image forming apparatus is shut off.

In recent image forming apparatuses, in order to further reduce a power consumption amount, a standby period for transition to the sleep mode (also referred to as a transition standby period to the sleep mode) is shortened. For example, there exists an image forming apparatus in which in network printing, the transition to the sleep mode immediately after print output realizes an increase in power saving performance (refer to Japanese Patent Application Laid-Open No. 2010-4150).

Shortening the transition standby period to the sleep mode results in a prolonged period of time during which the image forming apparatus is in the sleep mode. Thus, for example, in many cases, a user performing copy operation with the MFP is required to wait for return from the sleep mode and perform printing.

However, since the return from the sleep mode takes relatively long time, there arises a problem in that waiting time of the user becomes long, which decreases convenience for the user.

SUMMARY OF THE INVENTION

It is an object of the present invention to provide a printing technique that can reduce waiting time of a user.

According to a first aspect of the present invention, a print system comprises notification part for providing, to a user, a notification of an inquiry about whether concurrent printing output that an image forming apparatus performs first printing output and subsequently performs second printing output is scheduled, in a non-sleep period associated with the first printing output by the image forming apparatus; and setting part for setting a transition standby period for transition of the image forming apparatus to a sleep state at a first value when a reply for informing that the concurrent printing output is scheduled is not sent from the user, and setting the transition standby period at a second value which is larger than the first value when the reply is sent from the user.

According to a second aspect of the present invention, an image forming apparatus comprises notification part for providing, to a user, a notification of an inquiry about whether concurrent printing output that the image forming apparatus performs first printing output and subsequently performs second printing output is scheduled, in a non-sleep period associated with the first printing output; and setting part for setting a transition standby period for transition of the image forming apparatus to a sleep state at a first value when a reply for informing that the concurrent printing output is scheduled is not sent from the user, and setting the transition standby period at a second value which is larger than the first value when the reply is sent from the user.

These and other objects, features, aspects and advantages of the present invention will become more apparent from the following detailed description of the present invention when taken in conjunction with the accompanying drawings.

BRIEF DESCRIPTION OF THE DRAWINGS

FIG. 10 is a diagram showing a notification message;

FIG. 14 is a diagram showing a data table utilized in a second embodiment;

FIG. 15 is a diagram showing a data table utilized in the second embodiment;

FIG. 16 is a diagram showing a data table utilized in a third embodiment;

FIG. 17 is a diagram showing a data table utilized in a fourth embodiment;

DESCRIPTION OF THE PREFERRED EMBODIMENTS

Hereinafter, embodiments of the present invention will be described with reference to the drawings.

<1. First Embodiment>
<1-1. Overview>

A first embodiment exemplifies, as a print system, an authentication print system capable of performing authentication printing (to be described later).

Figure 1:
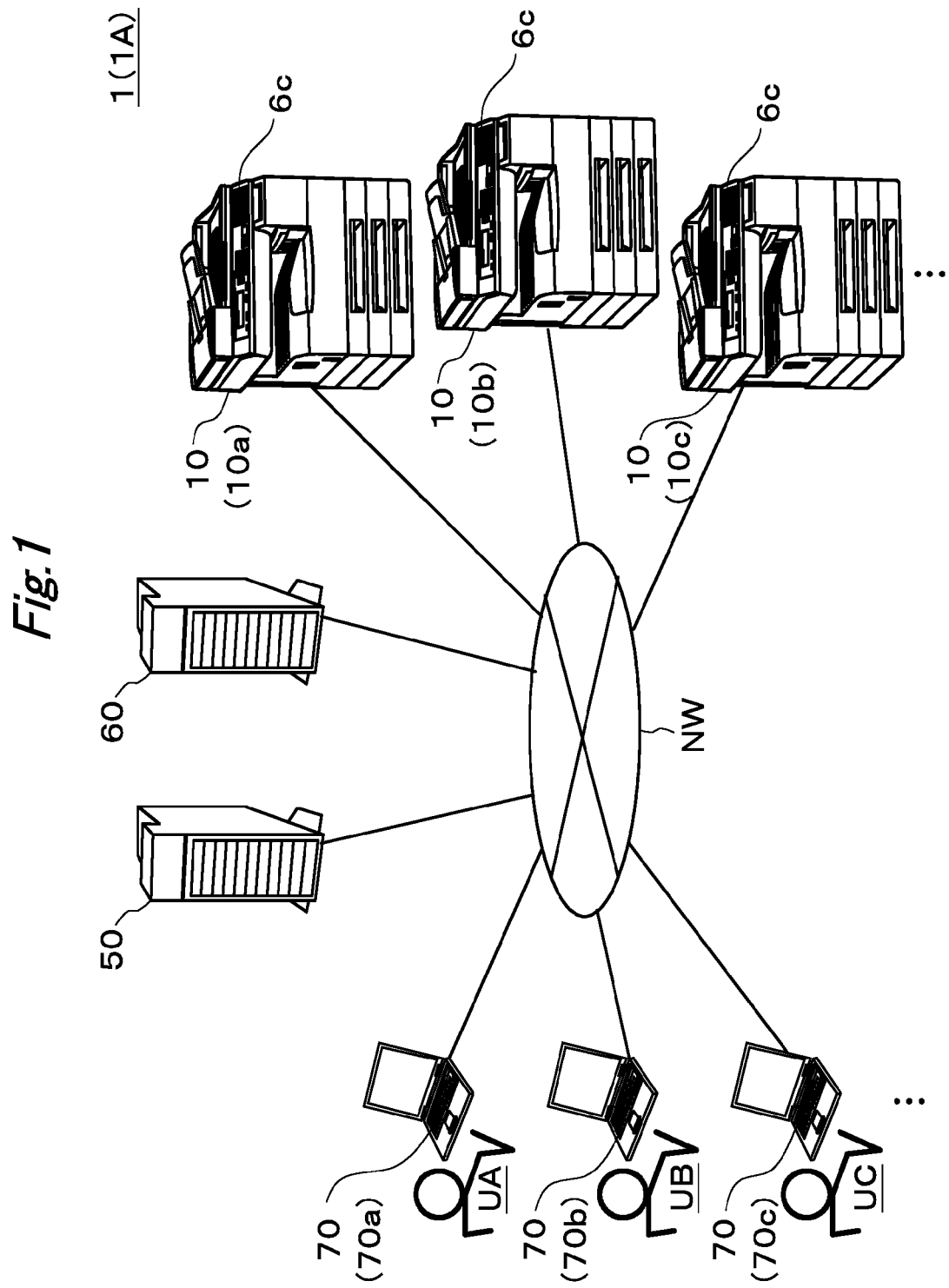
FIG. 1 is a schematic diagram showing a print system according to a first embodiment.

FIG. 1 is a schematic diagram showing a print system 1 (1A) according to the first embodiment.

As shown in FIG. 1, the print system 1A includes a plurality of image forming apparatuses 10 (particularly, 10a, 10b, 10c, . . . ) and a plurality of client computers (hereinafter, also referred to as simply "clients") 70 (70a, 70b, . . . ). Here, MFPs (Multi-Functional Peripherals) are exemplified as the image forming apparatuses (printing apparatuses).

The print system 1A further includes computers 50 and 60. The print server 50 is a server computer having a print server function, and the authentication server 60 is a server computer having an authentication processing function. The computer 50 is also referred to as a "print server", and the computer 60 is also referred to as an "authentication server".

The plurality of MFPs 10, the print server 50, the authentication server 60, and the plurality of clients 70 are mutually connected through a network NW, thereby establishing network communications. The network NW is configured by a LAN, a WAN, the Internet, and the like. Moreover, a connection form to the network NW may be wired connection or may be wireless connection.

The print system 1A is a print system capable of performing the following "authentication printing". Specifically, a user of this print system 1A performs authentication printing operation in the client 70 and performs spooling on a print job with authentication information in the print server 50. Thereafter, the user goes through authentication operation by the MFP 10, and causes the MFP 10 to print out printing data accumulated in the print server 50.

In the authentication printing as well, for reduction in power consumption, it is preferable that a standby period (also referred to as a transition standby period to the sleep mode) until the MFP 10 shifts to a sleep mode (also referred to as a low power consumption standby mode) is shortened to shift to the sleep mode relatively early.

Consequently, in this embodiment, there is proposed a technique, in which in principle, when authentication printing operation by a user UA has been completed in any one of the MFPs 10, the relevant MFP 10 is caused to shift to the sleep mode (sleep state) after a short standby period t1 (e.g., zero second to several ten seconds).

However, if the transition standby period to the sleep mode is constantly set to a very short period, time when the relevant MFP 10 is in the sleep mode state becomes longer. Thus, when a different user UB obtains the authentication printing output, using the relevant MFP 10, in most cases, the user UB is required to wait for return from the sleep mode. Since it takes relatively long time to return from the sleep mode, there arises a problem in that waiting time of the user becomes long, thereby decreasing the convenience of the user. The technique in which the transition standby period to the sleep mode is constantly set to the very short period t1 is also referred to as a technique according to a comparative example (or merely referred to as a comparative example).

Consequently, in this embodiment, the MFP 10a transmits a notification message MS to the different user UB in a non-sleep state duration (here, an authentication printing output period by the user UA) associated with first printing output by the user UA (of the MFP 10a). In this case, the user UB is a user who sends data for authentication printing output (different print job data) under spooling to the print server 50 (hereinafter, also referred to as a sending-side user). In other words, the user UB is a user who requests an authentication printing job under spooling (hereinafter, also referred to as a requesting user). Moreover, the "non-sleep state duration" is also referred to as a "non-sleep period", a "steady-state duration (or operating state duration)" or the like. The notification message MS contains an inquiry about whether second printing output by the MFP 10a is scheduled subsequently to the first printing output. In other words, the notification message MS contains an inquiry about whether the second printing output is scheduled within the non-sleep period regarding the first printing output (in short, concurrently) (also referred to as a schedule of concurrent printing output (or merely referred to as concurrent printing)).

In this manner, the MFP 10a provides the notification of the inquiry about whether the concurrent printing output to the user UB is scheduled, in the non-sleep period regarding the first printing output of the MFP 10a by the user UA.

When a reply for informing that the concurrent printing output is scheduled is not sent back from the user UB (including a case where a reply for informing that the concurrent printing output is not scheduled is sent back from the user UB), as in a principle, the relevant MFP 10 is caused to shift to the sleep mode immediately after the standby period t1 has passed since an end point of a print job JBa. On the other hand, when the reply for informing that the concurrent printing output is scheduled is sent from the user UB, exceptionally, the transition standby period for transition of the relevant MFP 10 to the sleep mode is extended from the relatively short period t1 to a relatively long period t2 (e.g., several minutes). Accordingly, the different user UB can print out the print job data under spooling, using the MFP 10 in the extended period (before the MFP 10 shifts to the sleep mode). Accordingly, the user UB can obtain the authentication printing output without waiting for the return from the sleep mode. That is, the waiting time of the user UB can be reduced.

The inquiry about whether the "concurrent printing output" is scheduled is also expressed as the inquiry about whether the printing output at the printing timing recommended by the system or the like (recommended printing timing) is scheduled. Moreover, the inquiry is expressed as invitation of the concurrent printing output.

Hereinafter, the foregoing will be described in detail.

<1-2. Configuration of MFP>

Figure 2:
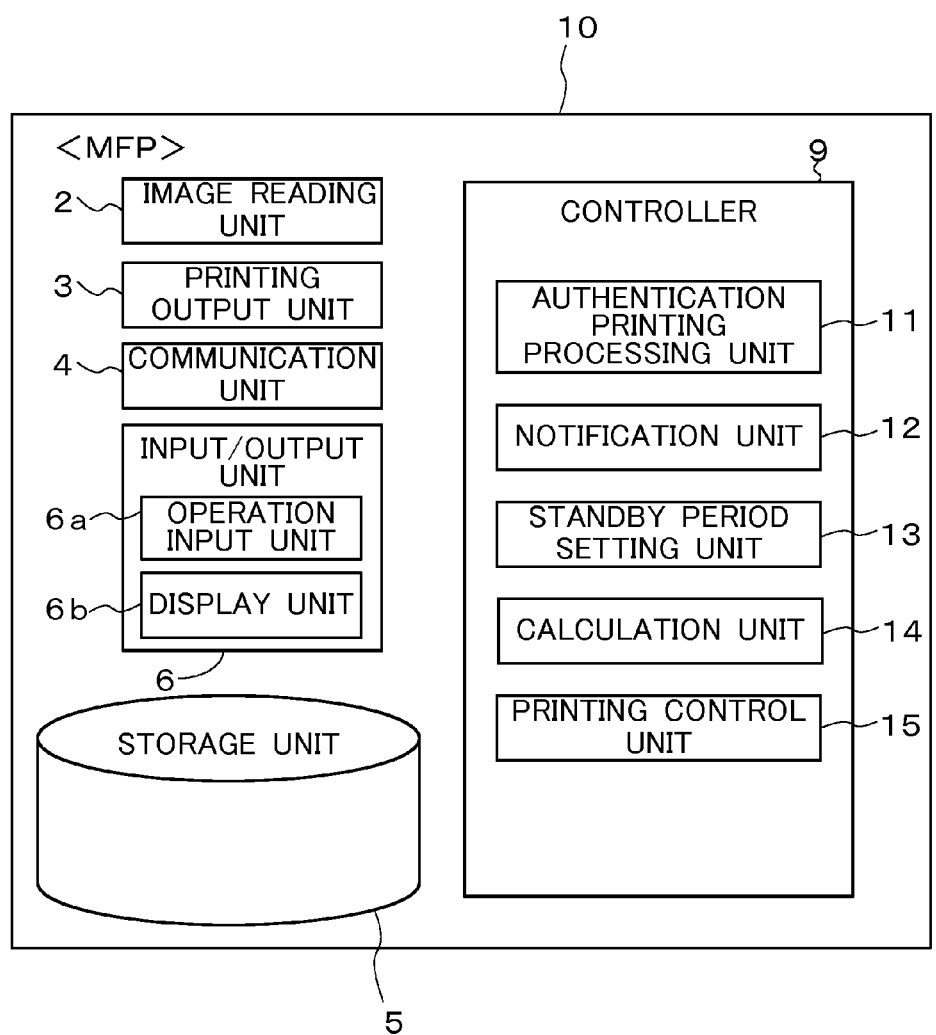
FIG. 2 is a functional block diagram showing a schematic configuration of an MFP.

FIG. 2 is a functional block diagram showing a schematic configuration of the MFP 10.

As shown in the functional block diagram of FIG. 2, this MFP 10 includes an image reading unit 2, a printing output unit 3, a communication unit 4, a storage unit 5, an input/output unit 6, a controller 9 and the like, and compositively operating these units implements various functions. The MFP 10 is also expressed as an image forming apparatus, a printing output apparatus or the like.

The image reading unit 2 is a processing unit that optically reads (i.e., scans) an original placed at a predetermined position of the MFP 10 to generate image data of the original (also referred to as an original image or a scan image). This image reading unit 2 is also referred to as a scan unit.

The printing output unit 3 is an output unit that prints out an image on various media such as paper, based on data regarding a printing object.

The communication unit 4 is a processing unit that can perform facsimile communication through public lines or the like. Furthermore, the communication unit 4 can perform network communication through a network NW. In this network communication, various protocols such as TCP/IP (Transmission Control Protocol/Internet Protocol) and FTP (File Transfer Protocol) are utilized. Utilizing the network communication enables the MFP 10 to receive and give various types of data between a desired counterpart and itself. Moreover, the MFP 10 can also transmit and receive an electronic mail, using this communication unit 4.

The storage unit 5 is configured by a storage device such as a hard disk drive (HDD). The storage unit 5 has one or a plurality of boxes. Each of the boxes is a storage area (memory area) provided in the MFP 10. In the boxes, various data files and the like are stored.

The input/output unit 6 includes an operation input unit 6a that accepts input to the MFP 10, and a display unit 6b that performs display output of various types of information. Particularly, an operation panel 6c (see FIG. 1) is provided in the MFP 10. This operation panel (touch screen) 6c is configured with piezoelectric sensors and the like embedded in a liquid crystal display panel, and functions as a part of the display unit 6b as well as functioning as a part of the operation input unit 6a.

The controller 9 is a control device that is included in the MFP 10, and comprehensively controls the MFP 10. The controller 9 is configured as a computer system including a CPU, various semiconductor memories (a RAM and a ROM) and the like. The controller 9 executes a predetermined software program (hereinafter, also referred to as simply a program) PG1 stored in the ROM (e.g., EEPROM) in the CPU to thereby implement various processing units. The program PG1 may be installed in the MFP 10 through a portable recording medium such as a USB memory, or through the network NW and the like.

As shown in FIG. 2, the controller 9 implements various processing units including an authentication printing processing unit 11, a notification unit 12, a standby period setting unit 13, a calculation unit 14, and a printing control unit 15.

The authentication printing processing unit 11 is a processing unit that executes the various types of processing in the authentication printing. For example, the authentication printing processing unit 11 accepts a printing output instruction (pull-print operation) of the printing data stored in the print server 50, and gives and receives the authentication information between the authentication server 60 and itself to decide whether or not the authentication printing is permitted.

The notification unit 12 decides a destination of the notification message MS (to be described later), and transmits the notification message MS to the decided destination.

The standby period setting unit 13 is a processing unit that sets a standby period until the MFP 10 in an operating state is caused to shift to the sleep state (sleep mode).

The calculation unit 14 is a processing unit that calculates estimated time of completion of the printing output by the printing output unit 3.

The printing control unit 15 is a processing unit that controls printing output operation of the printing output unit 3.
<1-3. Configuration of Print Server 50>

Figure 3:
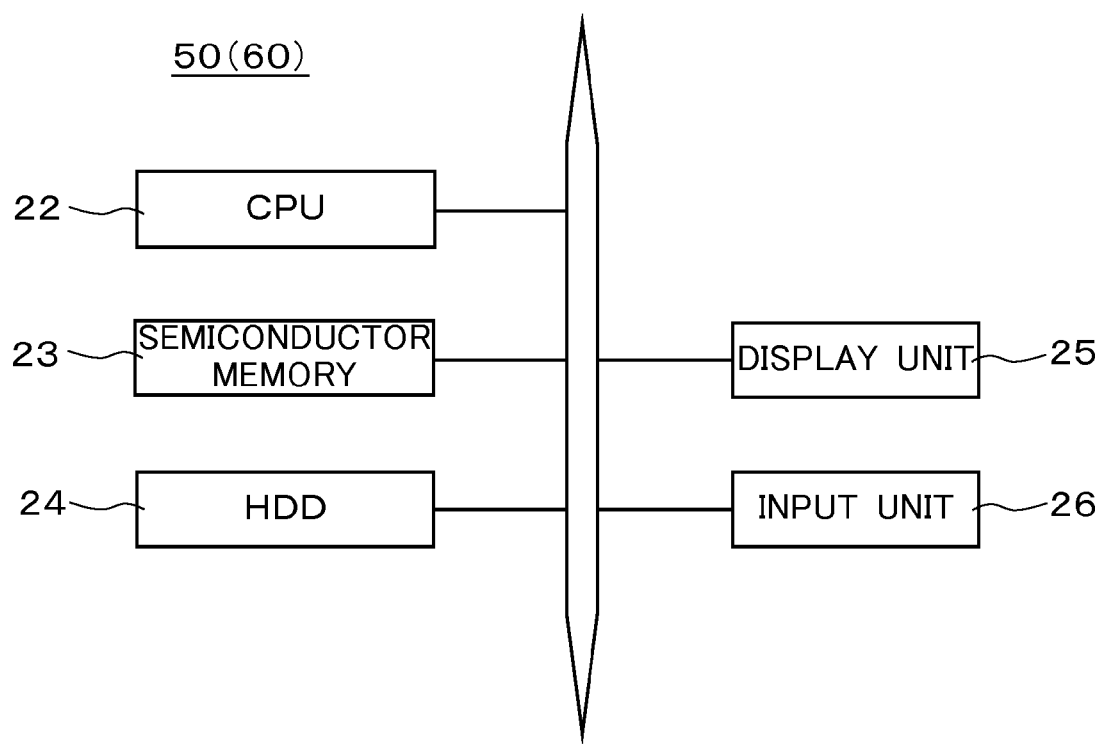
FIG. 3 is a diagram showing a configuration of a computer system.

The print server 50 is configured as a computer system (computer). Specifically, as shown in FIG. 3, the print server 50 includes a CPU 22, a semiconductor memory (RAM and the like) 23, a hard disk drive 24, a display unit (liquid crystal display unit and the like) 25, and an input unit (a keyboard, a mouse and the like) 26 (see FIG. 3). The print server 50 executes various programs PG2, using the CPU 22 and the like to thereby implement various functions. The programs PG2 are recorded on a portable recording medium such as a CD-ROM, a DVD-ROM or a USB memory, and are installed in the print server 50 through the recording medium. Alternatively, the programs PG2 may be installed in the print server 50 through the network NW and the like.

Figure 4:
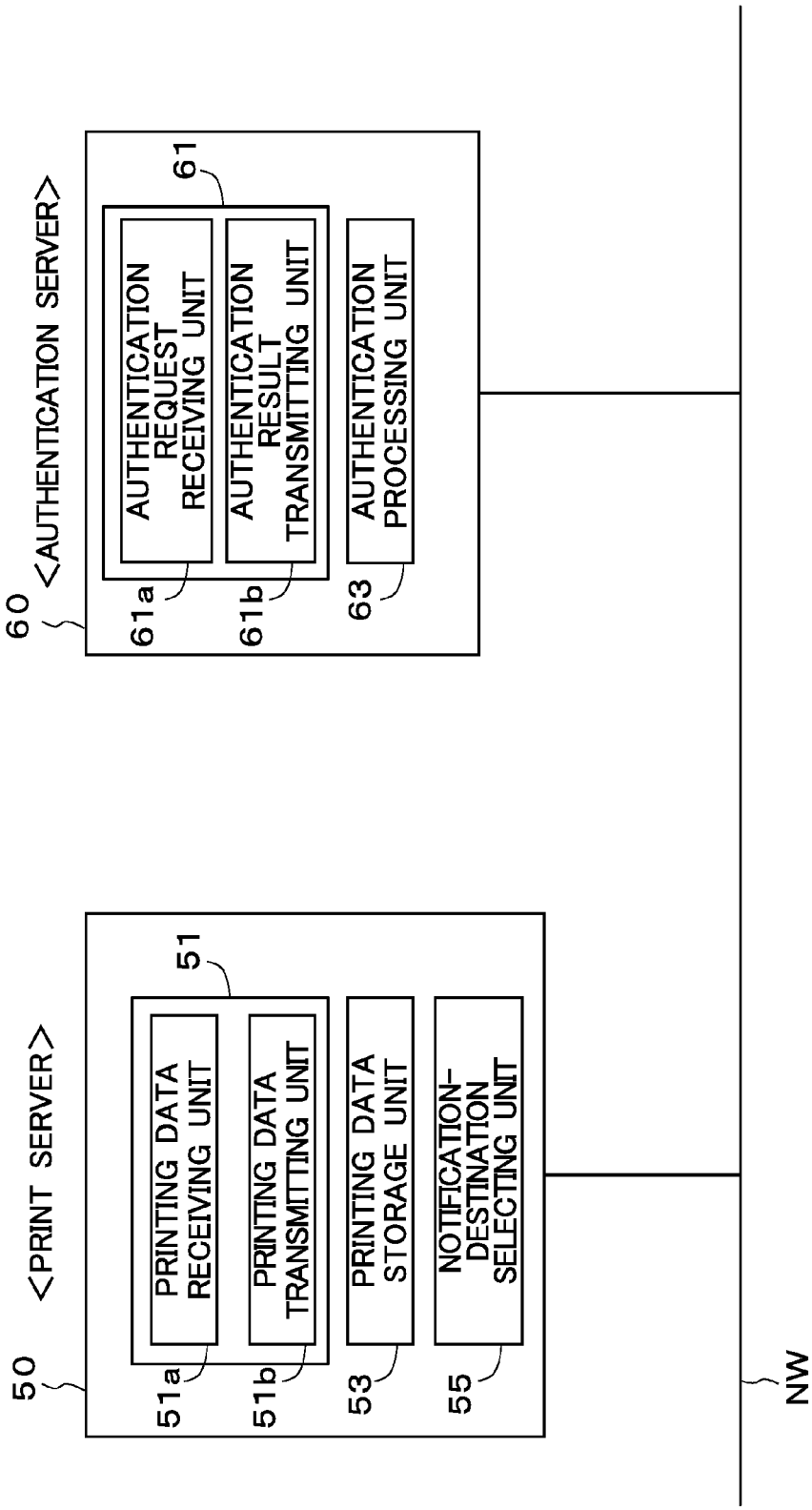
FIG. 4 is a functional block diagram showing configurations of a print server and an authentication server.

Moreover, the print server 50 includes a printing data receiving unit 51a, a printing data transmitting unit 51b, a printing data storage unit 53, and a notification-destination selecting unit 55, as shown in FIG. 4. FIG. 4 is a functional block diagram showing configurations of the print server 50 and the authentication server 60.

The printing data receiving unit 51a is a processing unit that receives a print job (particularly, print job data (printing data)) from each of the clients 70. The printing data transmitting unit 51b is a processing unit that transmits the print job data to each of the MFPs 10. The printing data receiving unit 51a and the printing data transmitting unit 51b are also collectively referred to as a printing data communication unit 51.

The printing data storage unit 53 is a processing unit that stores (performs spooling on) the print job from each of the clients 70.

The notification-destination selecting unit 55 is a processing unit that selects a notification destination (to be described later) of the notification message MS.

The print server 50 stores the print job from each of the clients 70. Particularly, the print job from each of the clients 70 is subjected to the spooling by the printing data storage unit (spooler) 53 of the print server 50. When the print job subjected to the spooling is a normal printing job, the print server 50 transfers the print job to the corresponding MFP (corresponding output printer) to cause the relevant MFP to print out. On the other hand, when the print job subjected to the spooling is an authentication printing job, the print server 50 holds the print job as it is. Thereafter, at a point when an authentication output request is transmitted from one of the MFPs 10, the print job is transferred to the relevant MFP 10 to cause the corresponding output printer to print out.
<1-4. Configuration of Authentication Server 60>

The authentication server 60 is also configured as a computer system (computer) similarly to the print server 50 or the like.

This authentication server 60 includes an authentication request receiving unit 61a, an authentication result transmitting unit 61b, and an authentication processing unit 63, as shown in FIG. 4.

The authentication request receiving unit 61a is a processing unit that receives authentication request data containing the authentication information and the like inputted by an operating user in each of the MFPs 10. Moreover, the authentication processing unit 63 is a processing unit that compares the authentication information transmitted from each of the MFPs 10 and legitimate authentication information registered previously to execute authentication operation. Furthermore, the authentication result transmitting unit 61b is a processing unit that sends back an authentication result by the authentication processing unit 63 to the MFP 10. The authentication request receiving unit 61a and the authentication result transmitting unit 61b are also collectively referred to as an authentication information communication unit 61.
<1-5. Configuration of Client Computer>

Each of the clients 70 is also configured as a computer system (computer) similarly to the print server 50 or the like.

A predetermined OS (Operating System) is installed in the client 70, so that a plurality of software programs can be executed on the OS. The plurality of software programs include application software of a relatively upper hierarchy (e.g., a word processor) and the like.

In the application software (e.g., the word processor) or the like, the printing operation by the user is executed. This allows the normal printing and the authentication printing to be performed.

<1-6. Operation in Present System>

Next, operation in this system 1A will be described with reference to FIGS. 5 to 9 and the like. FIGS. 5 to 8 are diagrams sequentially showing a flow of the data and the like in the system 1A, and FIG. 9 is a flowchart showing a part of operation.

Figure 5:
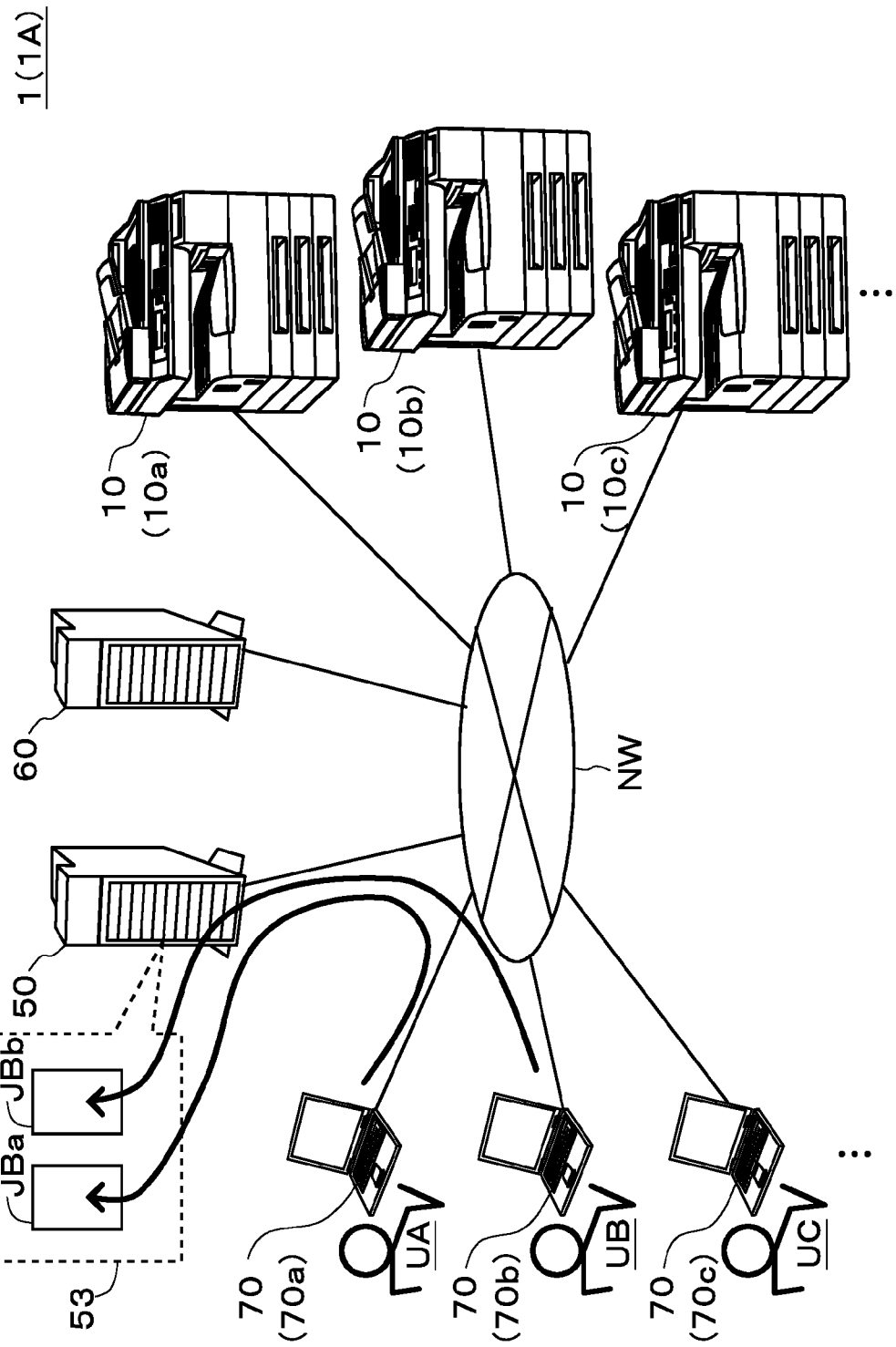
FIG. 5 is a diagram showing a flow of data and the like in the print system.
Figure 13:
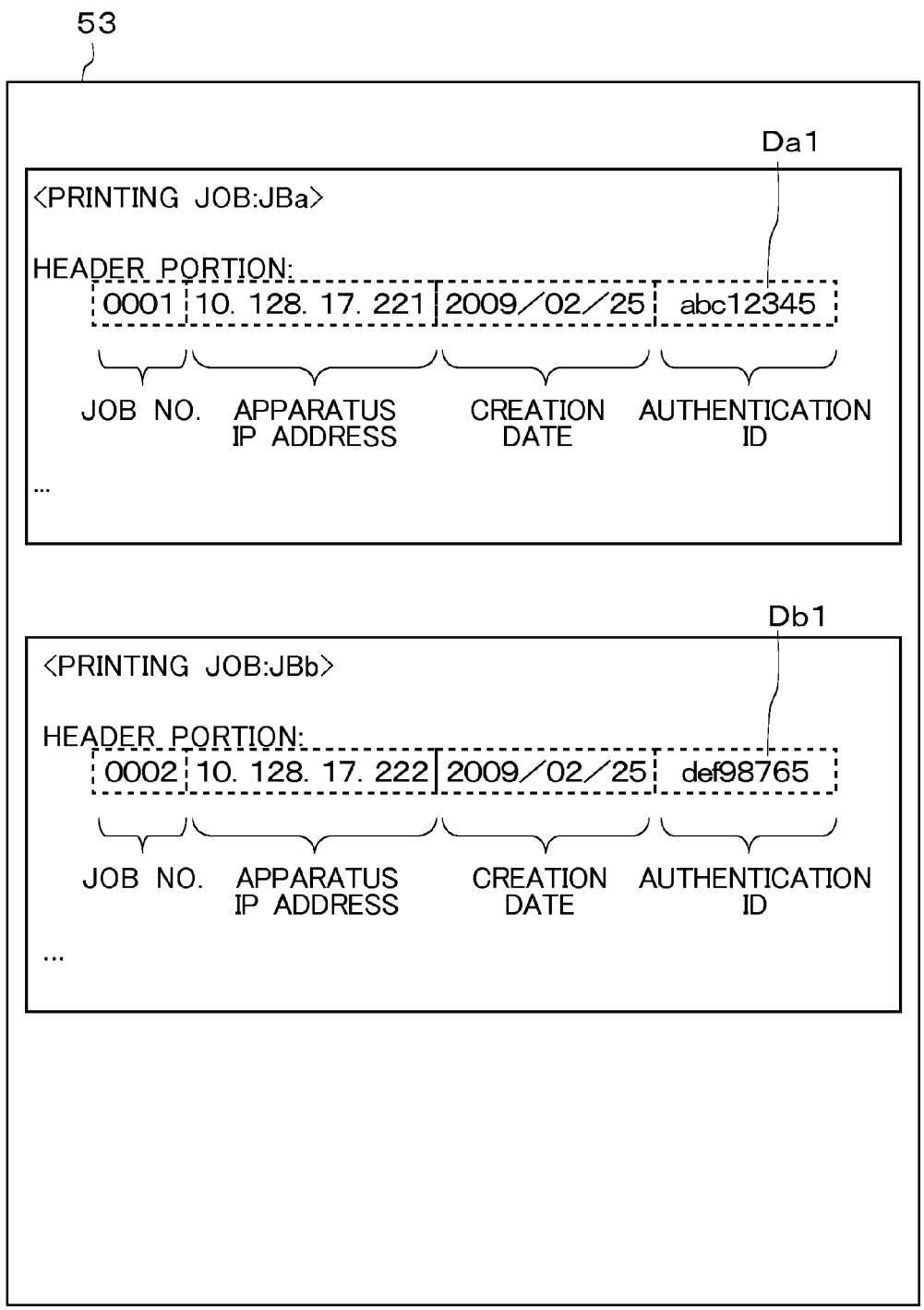
FIG. 13 is a conceptual diagram showing a configuration of a header portion and the like of each print job data.

First, as shown in FIG. 5, the user UA performs an authentication printing instruction, using the client 70a. In response to this authentication printing instruction, data for authentication printing output (print job data) JBa generated in the client 70a is transmitted from the client 70a to the print server 50 to be subjected to the spooling by the printing data storage unit (spooler) 53 inside the print server 50. In a header portion of this print job data JBa, authentication information Da1 (e.g., only authentication ID) of the user UA is contained (see FIG. 13).

Similarly, an authentication printing instruction by another user is given. For example, an authentication printing instruction by the user UB is executed, and data for authentication printing output (print job data) JBb generated in the client 70b is transmitted from the client 70b to the print server 50 to be subjected to the spooling by the printing data storage unit 53 inside the print server 50. In a header portion of this print job data JBb, authentication information Db1 (e.g., only authentication ID) of the user UB is contained (see FIG. 13).

In the authentication printing, the printing output is not performed until each of the users performs authentication printing output operation (pull-print operation), using the MFP 10.

Figure 6:
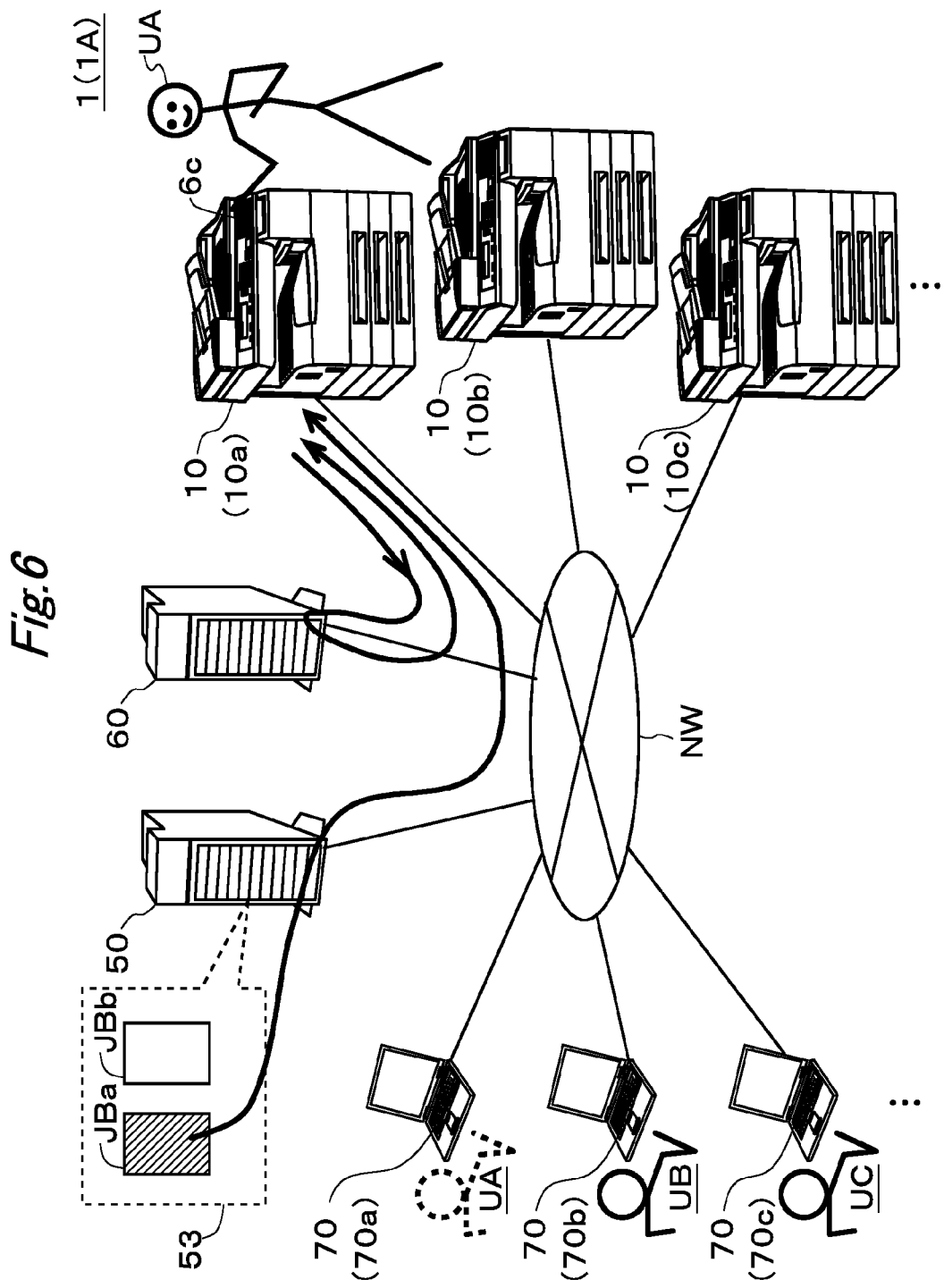
FIG. 6 is a diagram showing a flow of the data and the like in the print system.

Thereafter, as shown in FIG. 6, the user UA moves to a placing place of the MFP 10a at certain timing to perform the pull-print operation, using the MFP 10a.

Specifically, first, the user UA starts the authentication printing output operation, as also shown in FIG. 9 (step S11). Particularly, the user UA inputs authentication information Da2 (the authentication ID and a password), using the operation panel 6c of the MFP 10a to start the authentication operation (a time T11). In the case where the MFP 10a has shifted to the sleep state (sleep mode), return processing from the sleep state to the steady state (normal mode) is also performed.

The MFP 10a transmits the inputted authentication information Da2 to the authentication server 60 together with the authentication processing request data. When the authentication information Da2 and the like are received by the authentication request receiving unit 61a of the authentication server 60, the authentication processing unit 63 of the authentication server 60 checks the inputted authentication information Da2 (the authentication ID and the password) against the legitimate authentication information Da1 (the authentication ID and the password) to execute the authentication processing. In the authentication server 60, the legitimate authentication information Da1 (authentication ID and the password) is stored previously.

When the inputted authentication information Da2 is determined to match with the legitimate authentication information Da1, the authentication server 60 (particularly, the authentication result transmitting unit 61b) transmits "authentication success" to the MFP 10a, and transmits the print job JBa to the MFP 10a through the print server 50. When the inputted authentication information Da2 is determined to not match with the legitimate authentication information Da1, the authentication server 60 (the authentication result transmitting unit 61b) transmits "authentication failure" to the MFP 10a. At the time of the authentication failure, the print job JBa is not transmitted to the MFP 10a.

The MFP 10a receives the print job JBa from the print server 50 only at the time of "authentication success", and starts the printing output operation of the print job JBa, using the printing output unit 3 of the MFP 10a (step S12 (a time T12)).

Next, the MFP 10a requests searching processing regarding the "notification destination" of the notification message MS (to be described later) to the print server 50 (step S13).

The print server 50 searches the unoutputted print job data, which is stored in the printing data storage unit 53, and specifies requesting users (sending-side users) (step S14). Specifically, the requesting users (sending-side users) of the respective print jobs are specified based on the authentication information (e.g., the authentication IDs (see FIG. 13)) contained in the unoutputted (and non-during-output) print job data JB.

The print server 50 (the notification-destination selecting unit 55) decides the notification destinations (notification-destination users) of the notification message MS (to be described later). Here, all the requesting users (sending-side users) of the respective print jobs are selected as the notification-destination users. However, the user UA under log-in (under printing operation) to the MFP 10a is excluded from the notification-destination users.

For example, in a state of FIG. 6, the user UB corresponding to the unoutputted print job JBb is decided as the notification-destination user of the notification message MS. The print job JBa under printing output and the corresponding user UA is excluded from search targets.

The print server 50 transmits information M1 regarding the decided notification-destination users (e.g., an electronic mail address of the notification-destination user) to the MFP 10a.

Upon receiving the information M1, the MFP 10a creates the notification message MS, based on the information M1 and the like (step S15). For example, the notification message MS contains a phrase such as "Printing is now being performed in the MFP No. 1. The printing processing will be completed in five minutes. Will you continuously perform printing with the MFP No. 1 during operation of the same machine?". This notification message MS is a message of an inquiry about whether the "concurrent printing output" is scheduled.

It is preferable that the notification message MS contains information about an estimated time of completion of a printing output regarding the print job JBa being currently performed (such as "the printing will be completed in five minutes" and the like). The estimated time of completion of the printing output regarding the print job JB may be expressed as time required for printing (e.g., "five minutes") of the print job JBa, or may be expressed as an estimated time of completion which is calculated based on a current time and the time required for printing (e.g., "13:00").

Specifically, the calculation unit 14 of the MFP 10a calculates time required for the printing output (time required for printing) ta (e.g., five minutes) of the print job JBa, based on printing output performance of the printing output unit 3 (printing output speed), and a data amount of the print job JBa. The calculation unit 14 finds the information about the estimated time of completion of the printing output, based on the calculated time required for printing and the like. The found information is contained in the notification message MS.

Figure 7:
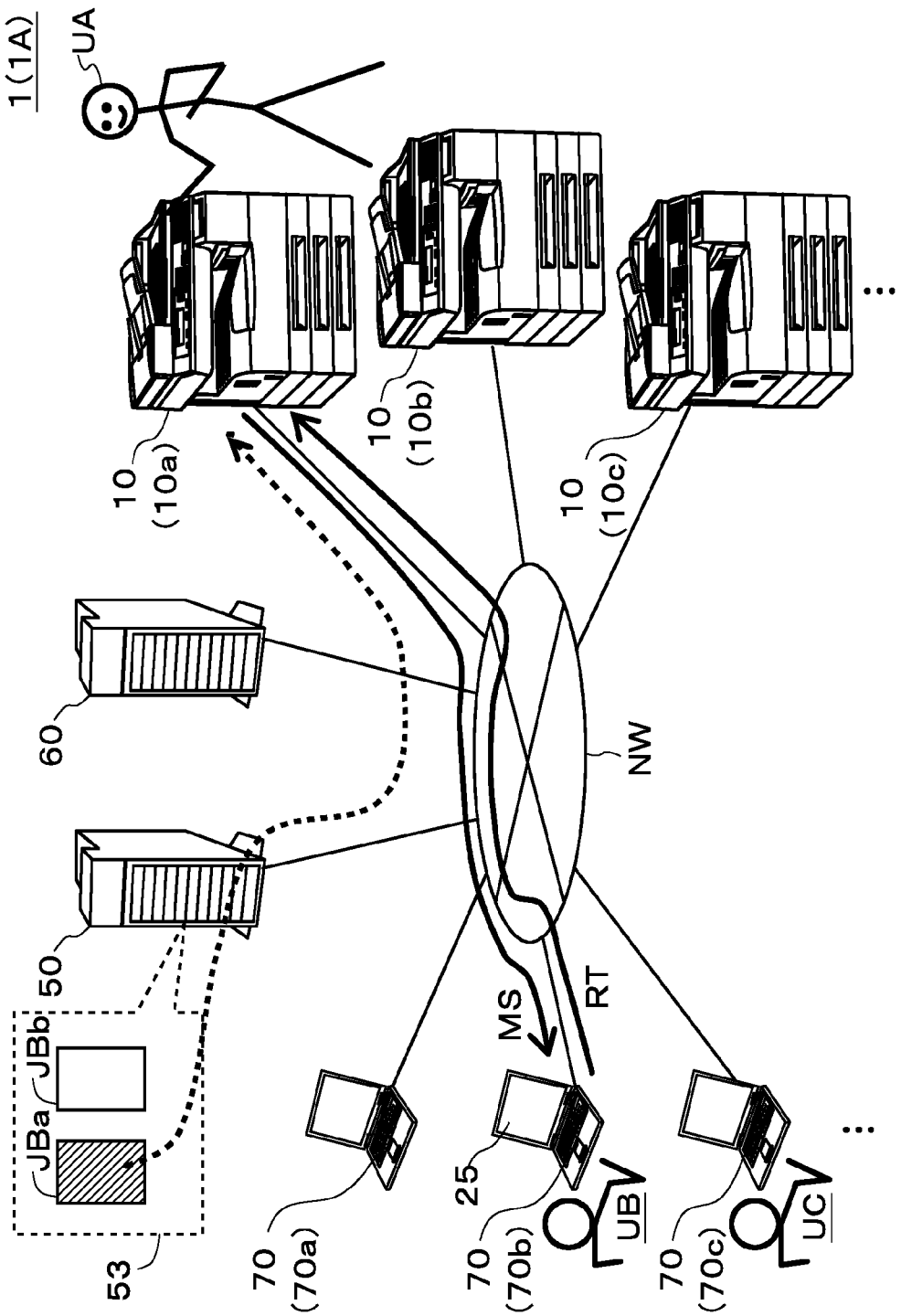
FIG. 7 is a diagram showing a flow of the data and the like in the print system.

The notification unit 12 of the MFP 10a decides the notification-destination users decided by the print server 50 as final notification-destination users as they are, and transmits the notification message MS to communication destinations regarding the notification-destination users (see FIG. 7). Moreover, the communication destinations (notification destination addresses and the like) regarding the notification-destination users of the notification message MS are decided, based on the above-described information M1. For example, the notification message MS is transmitted to the electronic mail address of the notification-destination user UB.

The client 70b of the user UB receives the notification message MS at the electronic mail address of the user UB, and the details of the notification message MS are displayed on the display unit 25 (see FIGS. 3 and 7) of the client 70b (see FIG. 10) (step S16).

In this manner, the MFP 10a transmits the notification message MS to the different user UB in the authentication printing output period by the user UA. This allows the notification of the inquiry about whether the concurrent printing output is scheduled. Particularly, the estimated time of completion of the printing output, which is calculated by the calculation unit 14, is notified to the different user UB, and the inquiry about whether the concurrent printing output is scheduled is sent to the relevant user.

The user UB, visually checking the notification message MS, decides whether or not to perform the authentication printing output of the print job JBb under spooling, using the currently operating MFP 10a (the MFP 10a in the non-sleep state). At this time, as described above, the notification message MS contains the estimated time of completion of the printing output regarding the printing job JBa (e.g., five minutes later). This makes it easier for the notification-destination user UB to determine whether or not to perform the concurrent printing output.

When it is decided to perform the concurrent printing output (particularly, to continuously perform the authentication printing of the print job JBb, using the MFP 10a after the end of the print job being currently performed), an instruction RT containing that effect is sent from the user UB. For example, a reply mail to the effect that "the concurrent printing output is scheduled" in a predetermined form is transmitted as the instruction RT from the client 70b to the MFP 10a.

When the MFP 10a receives the reply mail, and recognizes that "the user UB is intended to perform the concurrent printing output", the MFP 10a sets a transition standby period SB for transition of the MFP 10a to the sleep mode at the relatively long period t2 (e.g., several minutes) (t2>t1) in place of the relatively short period t1 (e.g., zero to several seconds) (step S17). In this manner, the MFP 10a (the standby period setting unit 13) extends the transition standby period SB from the reference value t1 to the value t2 after the extension.

Thereafter, the printing output of the print job JBa of the user UA is completed (step S18 (a time T18)). This allows the user UA to obtain a printing output object of the print job JBa (only at the time of "authentication success").

Figure 8:
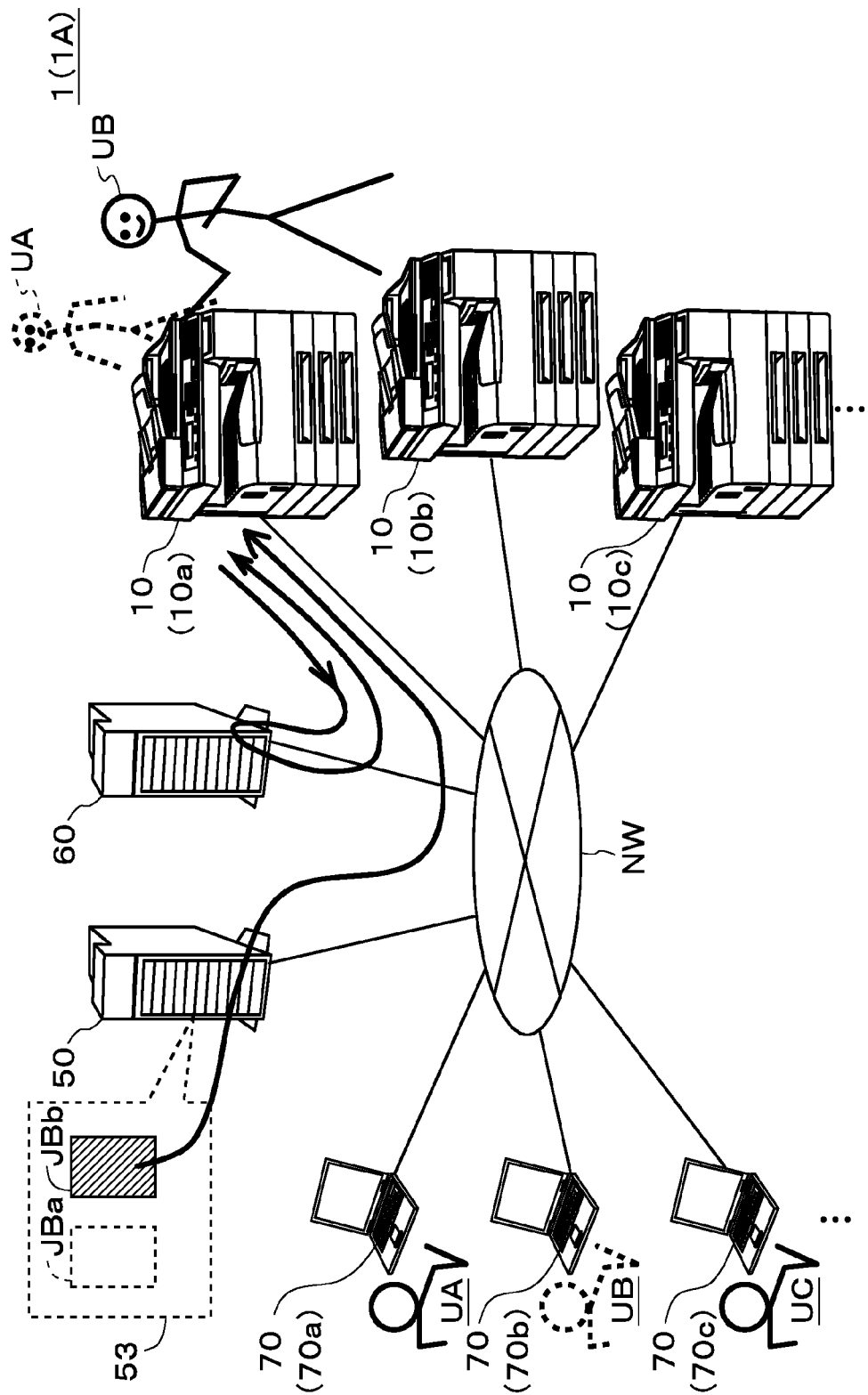
FIG. 8 is a diagram showing a flow of the data and the like in the print system.
Figure 9:
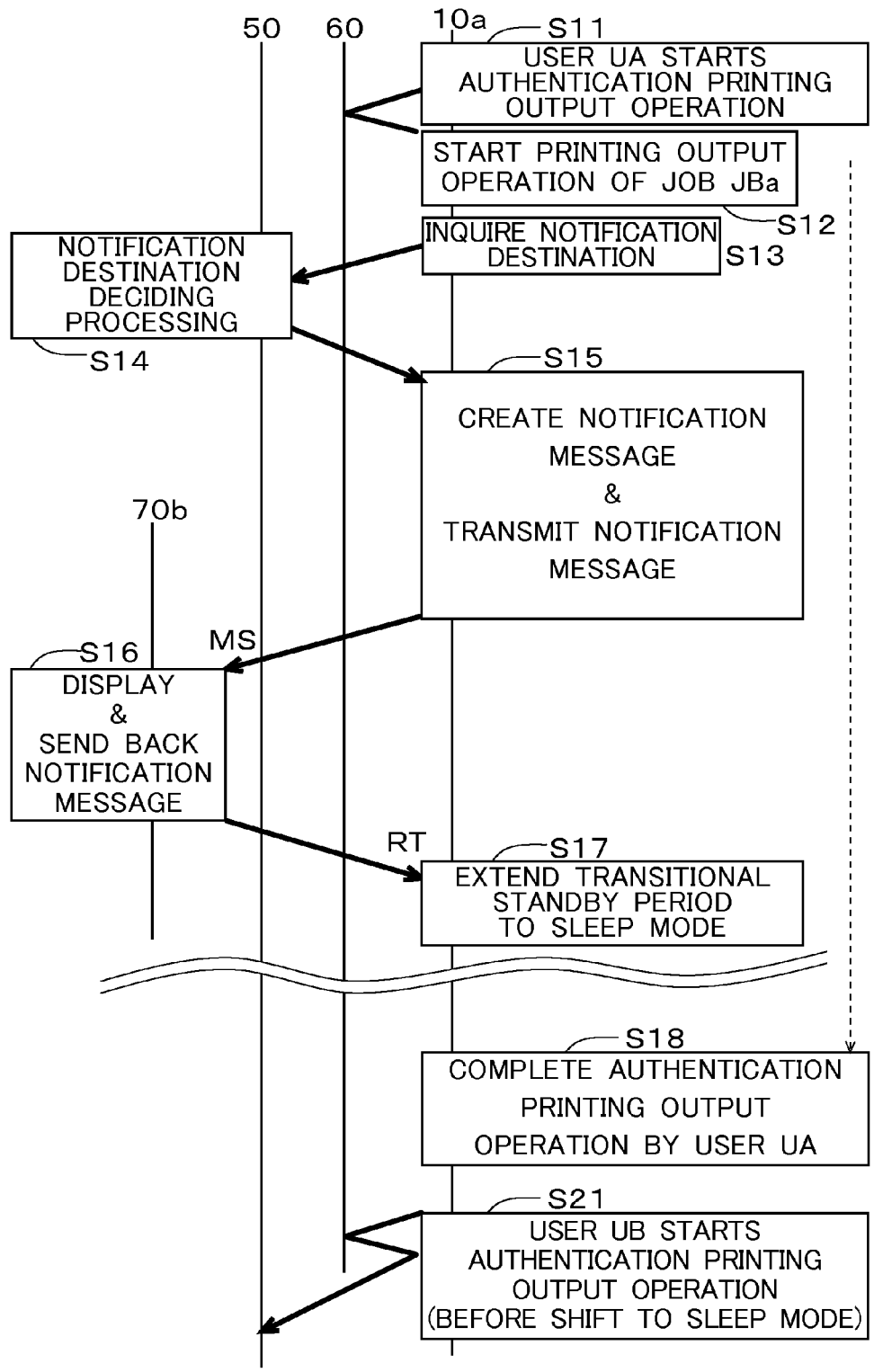
FIG. 9 is a flowchart showing a part of operation according to the first embodiment.

The user UB moves to the placing place of the MFP 10a around the time of the completion of the printing output of the print job JBa by the user UA to start the authentication printing output operation of his or her own print job JBb (step S21) (also see FIG. 8). The MFP 10a goes through the authentication processing by the authentication server 60, and receives the print job JBb from the print server 50 to execute the printing output operation of the print job JBb, using the printing output unit 3. This allows the user UB to obtain an printing output object of the print job JBb.

At this time, if the transition standby period SB for transition of the MFP 10a is extended, the user UB can print out the print job JBb under spooling, subsequently to the print job JBa of the user UA, using the MFP 10a in the operation period of the MFP 10a (in the extended operation period) (before the MFP 10a shifts to the sleep mode). Accordingly, the user UB can obtain the authentication printing output by the MFP 10a without waiting for the return from the sleep mode. That is, the waiting time of the user UB can be reduced.

If although the printing output of the printing job JBa of the user UA is completed (or a predetermined period has passed since the notification message transmission in step S15), the reply mail from the notification-destination user UB is not received, the MFP 10a determines "the concurrent printing output by the user UB is not performed", and does not extend the transition standby period SB. The MFP 10a, as in a principle, shifts to the sleep mode immediately after the standby period t1 has passed since the end point of the print job JBa (the time T18).

Figure 11:
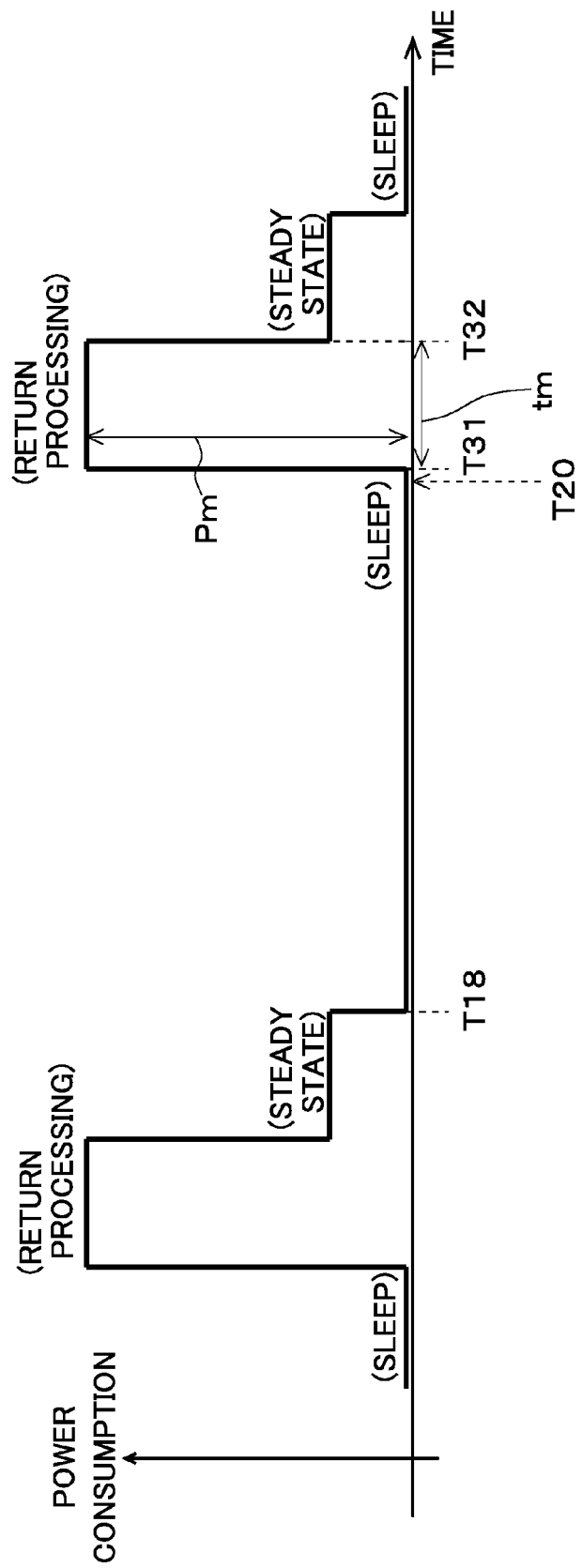
FIG. 11 is a diagram showing temporal change in power consumption (a comparative example)
Figure 12:
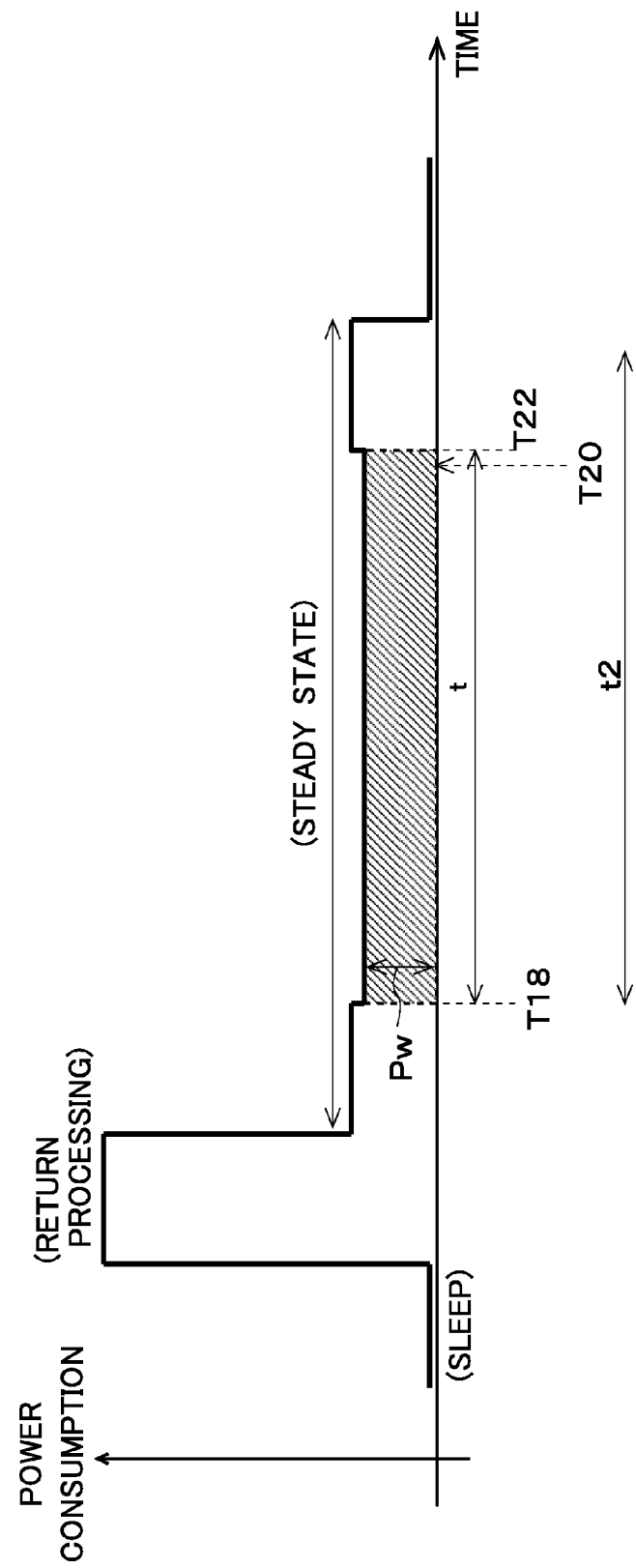
FIG. 12 is a diagram showing temporal change in power consumption (the first embodiment)

FIGS. 11 and 12 are conceptual diagrams showing temporal change in power consumption. FIG. 11 shows a case where the transition standby period SB is not extended, and FIG. 12 shows a case where the transition standby period SB is extended. FIG. 11 corresponds to operation according to a comparative example, and FIG. 12 corresponds to operation according to this embodiment.

As shown in FIG. 11, in the case where the transition standby period SB is not extended, after the printing output operation of the print job JBa of the user UA has completed at the time T18, and the predetermined transition standby period t1 (zero in FIG. 11) has passed, the MFP 10a shifts to the sleep mode. Thereafter, the user UB starts the authentication printing output operation regarding the print job JBb at a time T20. The MFP 10a then starts the return processing from the sleep mode at a time T31 immediately after the time T20, and returns to the steady state (operating state) at a time T32 after a period tm required for the return processing to start the printing output operation of the print job JBb of the user UB. In this manner, the user UB needs to wait for the lapse of the period tm required for the return from the sleep mode, when performing the printing output of the print job JBb.

On the other hand, as shown in FIG. 12, in this embodiment, the transition standby period SB is extended, and even after the printing output operation of the print job JBa of the user UA is completed at the time T18, the MFP 10a is in the steady state (operating state). The user UB, having received the notification message MS from the MFP 10a, starts the authentication printing output operation regarding the print job JBb at the time T20. At this time, since the MFP 10a is in the steady state, the return processing from the sleep state (sleep mode) is not required to be performed. Thus, the printing output operation of the print job JBb of the user UB is started at a time T22 immediately after the time T20. That is, the print job JBb of the user UB is started without waiting for the lapse of the return period tm from the sleep mode.

As described above, in the first embodiment, in the non-sleep period (non-sleep period of the MFP 10a) associated with the authentication printing output of the authentication printing job JBa by the user UA, the inquiry about whether current printing output that the different printing output is performed subsequently to the printing output of the print job JBa is scheduled is sent to the different user UB (the requesting user of the authentication printing job under spooling). When the reply for informing that the concurrent printing output is scheduled is sent from the user UB, the transition standby period for transition of the MFP 10a to the sleep mode is extended to the relatively large second value t2. Thus, before the MFP 10a shifts to the sleep mode, the new authentication printing output using the MFP 10a can be performed. Accordingly, the user UB can obtain the new authentication printing output without waiting for the return from the sleep mode. That is, the waiting time of the user UB can be reduced.

The transition standby period t2 after the extension is preferably decided so as to satisfy an expression (1).

$$Pw \cdot T2 \leq Pm \cdot Tm \quad (1)$$

A value Pm is required power consumption in returning from the sleep mode (also referred to as return electric power), and the value tm is the required time in returning from the sleep mode, and a value Pw is power consumption in the standby period (also referred to as standby power consumption).

The above expression (1) represents a condition that a power consumption amount (Pw·t2), which is consumed in the transition standby period t2 after the extension associated with the extension of the transition standby period SB, is equal to or smaller than a power consumption amount (Pm·tm) at the time of return from the sleep state to the steady state.

The transition standby period t2 after the extension satisfying the expression (1) can prevent the power consumption amount (Pw·t2) consumed in the transition standby period t2 from becoming excessive, thereby reducing the power consumption. That is, an increase in the power consumption attributed to the excess of the transition standby period t2 can be prevented.

While in the first embodiment, the case where the notification message MS is transmitted only to the single different user UB, which is the requesting user of the print job under spooling is exemplified, the present invention is not limited thereto. For example, the notification message MS may be transmitted to a plurality of users UB, UC and the like, which are the requesting users of the print jobs under spooling. Alternatively, whether or not the plurality of users UB, UC and the like are the requesting users of the print jobs under spooling, the notification message MS may be transmitted to the plurality of users UB, UC and the like.

Moreover, while in the first embodiment, the case where in the printing output period by the user UA, the notification message MS is transmitted is exemplified, the present invention is not limited thereto. Specifically, the notification message MS may be sent before the start of the printing output of the user UA (during the authentication printing instruction operation by the user UA (e.g., from the time T11 to the time T12) or the like). Alternatively, the notification message MS may be transmitted in a period after the completion of the printing output of the user UA and until the shift to the sleep mode (e.g., a period from the time T18 to a time T19 at which the time t1 has passed since the time T18) or the like. In this manner, the notification message MS need only be sent in the non-sleep period (e.g., from the time T11 to the time T19) of the MFP 10.

<Second Embodiment>

A second embodiment is a modification of the first embodiment.

The second embodiment exemplifies a case where the notification message MS is transmitted from the MFP 10 to a user with a high use frequency of the currently operating MFP 10a (MFP 10a in the non-sleep state) among the requesting users of the print jobs under spooling. Hereinafter, a description will be made while focusing on different points from the first embodiment.

FIG. 14 is a diagram showing a data table TB2 (TB2b) recording the use frequencies of the respective MFPs by the user UB.

In this data table TB2b, the use frequencies (numbers of times of use in a predetermined period TM) of the respective MFPs 10a, 10b, 10c, . . . of the user UB are recorded. In FIG. 14, it is recorded that the user UB has used the MFP 10a ("No. 1") 100 times in the predetermined period TM (e.g., for one year). That is, the use frequency of the MFP 10a ("No. 1") by the user UB is "100". Similarly, the use frequency of the MFP 10b ("No. 2") by the user UB is "94", and the use frequency of the MFP 10c ("No. 3") by the user UB is "30". Moreover, the use frequency of the MFP 10d ("No. 4") by the user UB is "10", and the use frequency of the MFP 10e ("No. 5") by the user UB is "1".

FIG. 15 is a diagram showing the data table TB2 (TB2c) recording the use frequencies of the respective MFPs by a different user UC. In FIG. 15, it is recorded that the user UC has used the MFP 10a ("No. 1") twice in the predetermined period TM (e.g., for one year). That is, the use frequency of the MFP 10a ("No. 1") by the user UC is "2". Similarly, the use frequency of the MFP 10b ("No. 2") by the user UC is "150", and the use frequency of the MFP 10c ("No. 3") by the user UC is "40". Moreover, the use frequency of the MFP 10d ("No. 4") by the user UC is "84", and the use frequency of the MFP 10e ("No. 5") by the user UC is "120".

For the other users UA, UD and the like as well, the similar data tables TB2 are recorded. The respective data tables TB2 are stored, for example, in the print server 50.

In this second embodiment, the print server 50 and the MFP 10a decide the user whose use frequency of the MFP 10a is equal to or higher than a predetermined threshold value (e.g., "90"), as the notification-destination user of the notification message MS in step S15 (see FIG. 9).

More particularly, a situation is assumed, where when the print jobs (authentication printing jobs) by the plurality of users UA, UB, UC and UD are subjected to spooling in the print server 50, the user UA is performing the authentication printing output of his or her own print job JBa, using the MFP 10a. In this situation, operation similar to that of the first embodiment is performed.

However, in step S15 (FIG. 9), the MFP 10a performing the authentication printing output transmits the notification message MS only to the user that satisfies a condition C1 described below among the users UB, UC and UD excluding the user UA performing the authentication printing output from all the requesting users UA, UB, UC and UD of the authentication printing jobs. As the condition C1, a condition that the notification-destination user is the user whose use frequency of the operating MFP 10 (MFP 10 in the non-sleep state) is equal to or higher than a predetermined threshold value TH1 (e.g., "90") is employed.

The print server 50 thus selects the notification-destination user, based on the condition C1 in step S14. For example, since the use frequency of the MFP 10a by the user UB is "100" (>TH1), the user UB satisfies the above-described condition C1, thereby being decided as the notification-destination user. On the other hand, since the use frequency of the MFP 10a by the user UC is "2" (<TH1), the user UC does not satisfy the above-described condition C1, thereby being excluded from the notification-destination user. For the other user UD as well, similarly, whether or not he or she is decided as the notification-destination user is decided in accordance with whether or not he or she satisfies the condition C1.

Only the users satisfying the condition C1 (e.g., the users UB and UD) are decided as the notification destinations. The print server 50 transmits the information about the notification destinations decided in this manner to the MFP 10a. Based on the information received from the print server 50, the MFP 10a decides the notification-destination users decided by the print server 50 as final notification-destination users as they are, and transmits the notification message MS to the notification-destination users.

Hereinafter, operation similar to that of the first embodiment will be performed.

Similar operation can be performed in each of the MFPs 10i. Particularly, in step S15, on condition that among the plurality of MFPs 10 in the print system 1, the relevant MFP 10i is determined as an apparatus whose use frequency by one of the requesting users is equal to or higher than the predetermined threshold value, each of the MFPs 10i transmits the notification message MS to the relevant requesting user. More particularly, for example, the MFP 10b notifies the user US of the requesting users of the notification message MS on condition that the use frequency of the MFP 10b by the requesting user UC is determined to be equal to or higher than the predetermined threshold value TH1.

The above-described aspect is allowed to produce advantageous effects similar to those of the first embodiment.

According to the above-described aspect, for example, the MFP 10a during authentication printing output transmits the notification message MS only to the user satisfying the above-described condition C1 among the users UB, UC and UD (the requesting users of the authentication printing jobs and the users that exclude the user UA performing the authentication printing output by the pull-print operation). In other words, on condition that the use frequency of the MFP 10a by the requesting user of each of the print jobs under spooling is determined to be equal to or higher than predetermined threshold value, the notification message MS is transmitted to the requesting user from the MFP 10a in the non-sleep state. Accordingly, the notification message MS can be transmitted only to the notification destination properly narrowed down. Particularly, the notification message MS can be efficiently transmitted to the user utilizing the MFP 10 with the high frequency. In other words, frequent useless notification of the notification message MS to the respective users can be suppressed.

While in the above-described second embodiment, the case is exemplified, where on condition that the use frequency of the MFP 10a by the requesting user of each of the print jobs under spooling is determined to be equal to or higher than the predetermined threshold value TH1, the notification message MS is sent to the requesting user, the present invention is not limited thereto. For the respective requesting users, eligibility as the notification-destination user of the notification message MS may be determined, based on another condition regarding the use frequency.

For example, on condition that the apparatus with the highest use frequency (also referred to as the highest use frequency apparatus) of the plurality of MFPs 10 in the print system to the requesting user of the authentication printing job under spooling is the MFP 10a (an object apparatus of concurrent printing output), the notification message MS may be sent to the requesting user. In other words, on condition that the use frequency of the MFP 10a (the object apparatus of concurrent printing output) by the requesting user is determined as the highest one of the use frequencies of the plurality of the MFPs 10 by the requesting user, the notification message MS may be sent to the requesting user.

For example, as shown in FIG. 14, the user UB utilizes the MFP 10a most frequently of the plurality of the MFPs 10 (10a to 10e). To the user UB, the notification message MS of the inquiry about whether the concurrent printing output regarding the MFP 10a is scheduled may be sent when the authentication printing output operation is being performed in the MFP 10a.

Similarly, as shown in FIG. 15, the user UC utilizes the MFP 10b most frequently of the plurality of the MFPs 10 (10a to 10e). To the user UC, the notification message MS of the inquiry about whether the concurrent printing output regarding the MFP 10b is scheduled may be sent when the authentication printing output operation is being performed in the MFP 10b.

The same things hold true for the other user UD and the like.

According to this, in terms of each of the users, the notification message MS of the inquiry about whether the concurrent printing output regarding the MFP that the relevant user utilizes most frequently of the plurality of MFPs is scheduled is transmitted. Accordingly, since each of the users can easily perform the concurrent printing output regarding the MFP that each of the users utilizes most frequently, the concurrent printing output in the MFP can be efficiently promoted.

<3. Third Embodiment>

A third embodiment is a modification of the first embodiment.

In this third embodiment, a case is exemplified, where whether or not to transmit the notification message MS from the operating MFP 10 (the MFP 10 in the non-sleep state) is determined, based on a type of the print job under spooling (here, whether the print job is a monochrome printing job or a color printing job). Hereinafter, a description will be made while focusing on different points from the first embodiment.

FIG. 16 is a diagram showing a data table TB3 (TB3b) recording an MFP designated for each of the types of the print jobs (print type) by the user UB.

In FIG. 16, a situation is shown, where the MFP 10a ("No. 1") is designated as an output apparatus for "color printing" by the user UB, and the MFP 10b ("No. 2") is designated as an output apparatus for "monochrome printing". In other words, a performance candidate apparatus of the "concurrent printing output" is selected and decided from the plurality of the MFPs 10i in accordance with the type of the print job to be outputted. The MFP 10a is an output apparatus that is designated by the requesting user UB in response to the color printing job (hereinafter, also referred to as a designated output apparatus), and the MFP 10b is an output apparatus that is designated by the requesting user UB in response to the monochrome printing job.

For the other users UA, UC, UD, . . . as well, the similar data tables TB3 are recorded.

In this manner, each of the data tables TB3 is a data table that previously designates the output apparatuses for each of the users. More particularly, each of the data tables TB3 is a data table that previously designates the output apparatuses (MFPs 10i) in accordance with the printing job types for each of the users. The data tables TB3 are stored, for example, in the print server 50.

The situation is assumed, where when the print jobs (authentication printing jobs) by the plurality of users UA, UB, UC and UD are subjected to spooling in the print server 50, the user UA performs the authentication printing output of his or her own print job JBa, using the MFP 10a. In this situation, operation similar to that of the first embodiment is performed.

In step S15 (FIG. 9), the MFP 10a performing the authentication printing output transmits the notification message MS only to the user satisfying a condition C3 described below among the user UB, UC and UD excluding the user UA performing the authentication printing output from all the requesting users UA, UB, UC and UD of the authentication printing jobs. Here, as the condition C3, a condition that the operating MFP 10 (the MFP 10 in the non-sleep state) is the designated output apparatus of the relevant user is employed.

Therefore, in the third embodiment, in step S14, the notification-destination selecting unit 55 of the print server 50 analyzes the printing job type (print type) of the print job JB under spooling. Specifically, the notification-destination selecting unit 55 determines whether the print job JBb under spooling by the user UB is the color printing job or the monochrome printing job.

Whether or not to select the user UB as the transmission destination in step S15 is decided by the notification-destination selecting unit 55, based on the table TB3b.

Particularly, when the print job JBb by the user UB is determined as the color printing job, the notification-destination selecting unit 55 selects the user UB as the notification destination by the operating MFP 10a, based on the table TB3b. The user UB is not selected as the notification destination by the other operating MFPs 10b, 10c, 10d, . . . and the like.

When the print job JBb by the user UB is determined as the monochrome printing job, the user UB is not selected as the notification destination by the operating MFP 10a. The user UB is not selected as the notification destination by the other operating MFP 10c, 10d, . . . and the like. On the other hand, the user UB is selected as the notification destination by the operating MFP 10b.

The above-described aspect is allowed to produce advantageous effects similar to those of the first embodiment.

According to the above-described aspect, for example, the MFP 10a performing authentication printing output (the MFP 10a in the non-sleep state) transmits the notification message MS only to the user satisfying the above-described condition C3 among all the requesting users UB, UC and UD other than the user UA performing the authentication printing output. Accordingly, the notification message MS can be transmitted only to the notification destination properly narrowed down. More particularly, since on condition that the operating MFP 10a is the designated output apparatus by the requesting user, the notification message MS is transmitted to the requesting user, the notification message MS can be transmitted efficiently. Particularly, on condition that the operating MFP 10a is the designated output apparatus that is designated previously by the requesting user in accordance with the printing job type, the notification message MS is transmitted to the requesting user. Accordingly, the notification message MS can be efficiently transmitted from one of the MFP 10i to the user who has designated the relevant MFP 10i as the output apparatus for each of the print types.

While in the third embodiment, the case where each of the users designates the output apparatus for each of the printing job types is exemplified, the present invention is not limited thereto. For example, each of the users may specify the desired one MFP 10 or the desired plurality of MFPs 10 in the data table TB 3 as the designated printing output apparatus(es) regardless of the printing job type. Each of the MFPs 10i may notify the notification message MS to the requesting user on condition that the relevant MFP 10i is the designated output apparatus by the requesting user.

<4. Fourth Embodiment>

A fourth embodiment is a modification of the first embodiment.

In the fourth embodiment, a case is exemplified where the notification-destination user is selected, based on room entry/exit information with respect to a room where the plurality of MFPs 10 are placed. Particularly, a case is exemplified, where the notification message MS is transmitted to the user who has entered the room through a door nearest the operating MFP 10 (the MFP 10 in the non-sleep state). Hereinafter, a description will be made while focusing on different points from the first embodiment.

Figure 18:
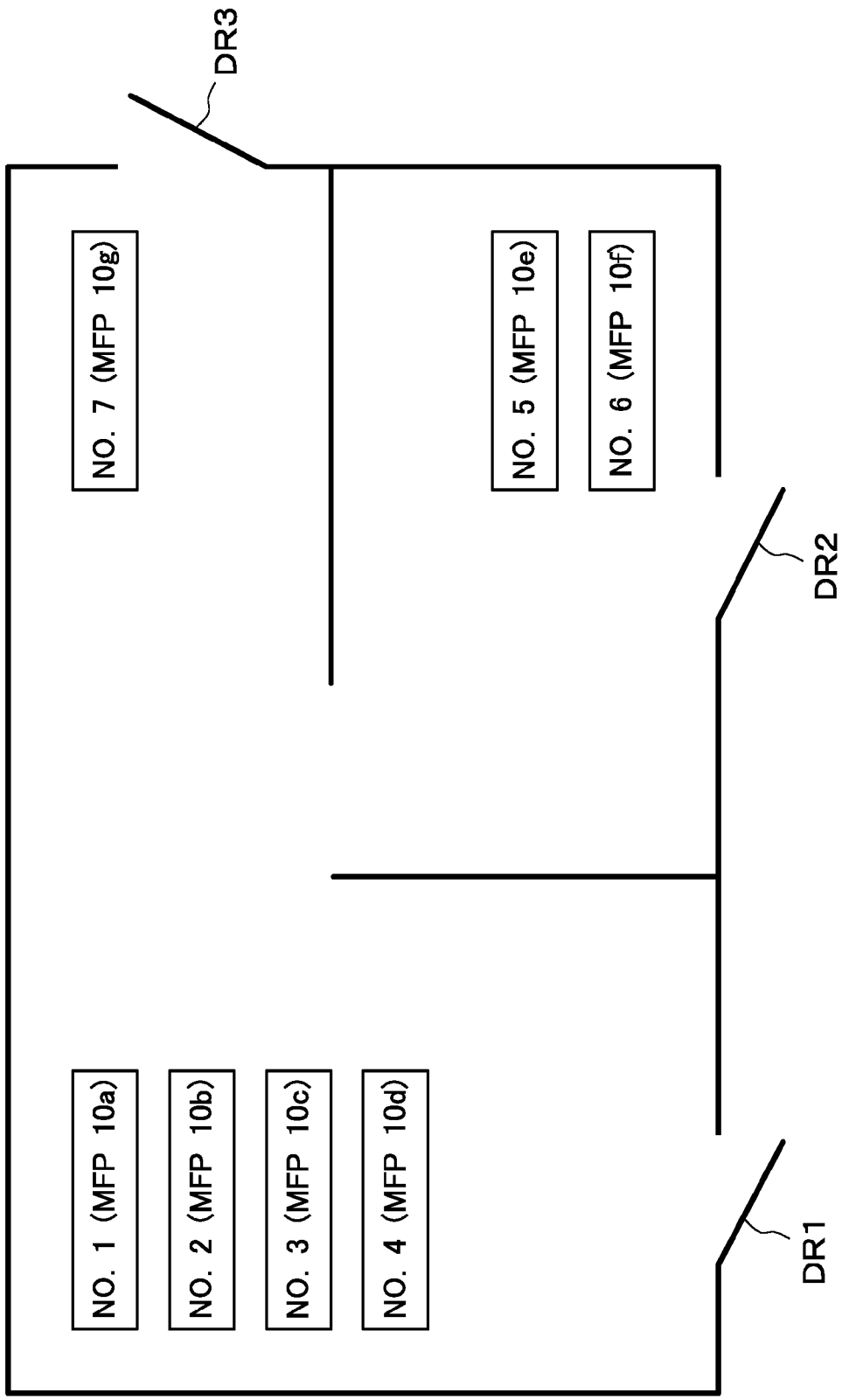
FIG. 18 is a diagram showing positional relationships between a plurality of doors and a plurality of MFPs.
Figure 19:
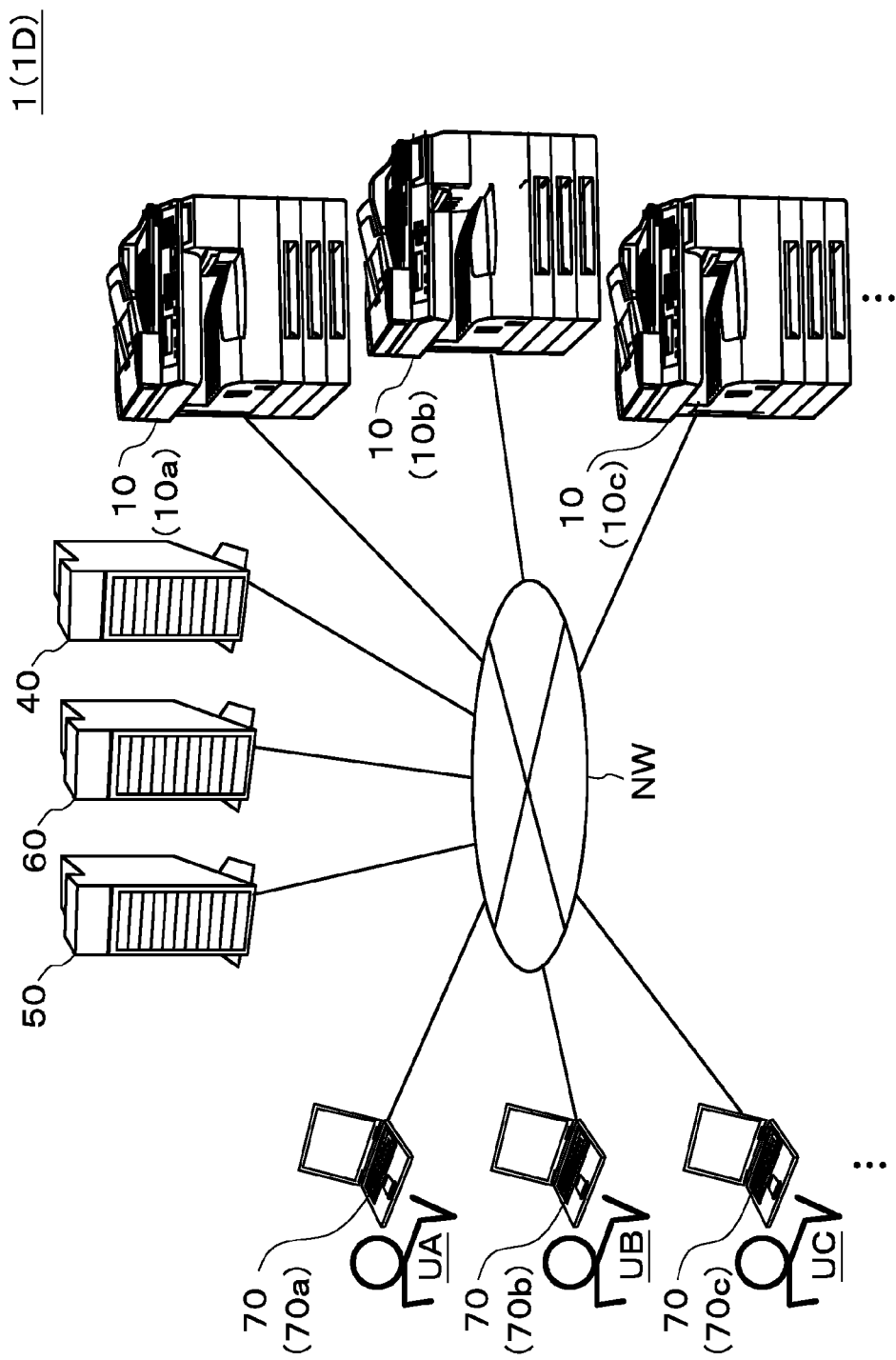
FIG. 19 is a schematic diagram showing a print system according to the fourth embodiment.
Figure 20:
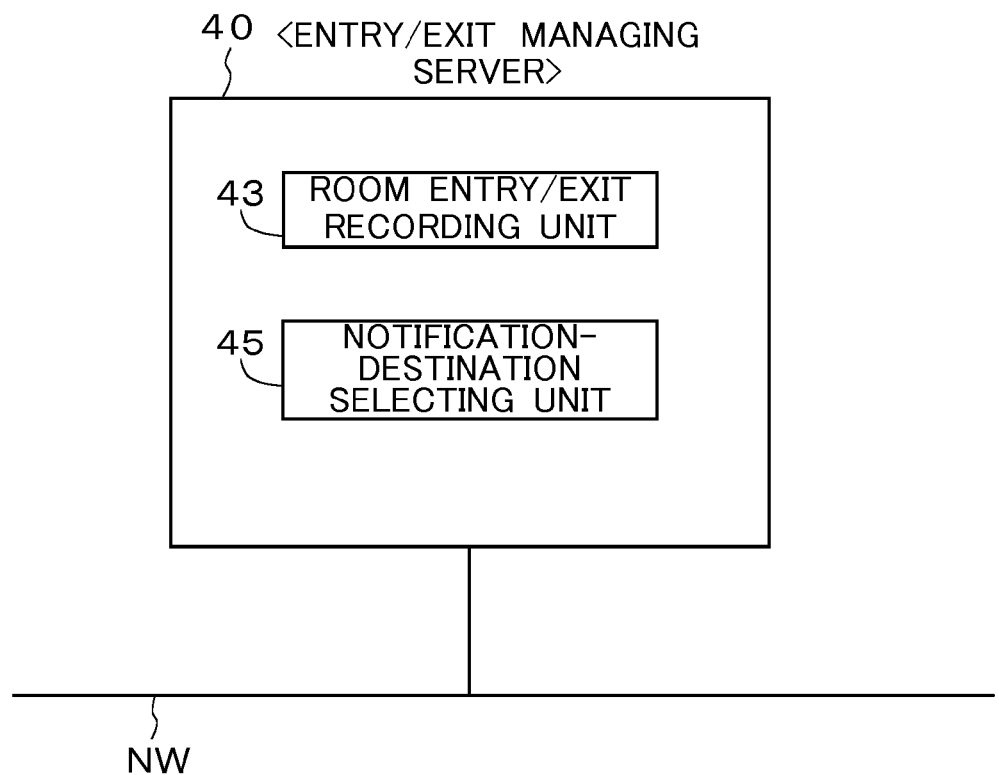
FIG. 20 is a functional block diagram showing a configuration of an entry/exit managing server.

FIG. 17 is a diagram showing a data table TB4 recording correspondence relationships between door numbers (also referred to as "entry door numbers"), which the respective users utilized when they entered the room, and the nearest MFPs. Moreover, FIG. 18 is a diagram showing positional relationships between a plurality of doors DR1 to DR3 and the plurality of MFPs 10a to 10g in the room. As shown in FIG. 18, in this room, the plurality of MFPs 10 (10a to 10g) of the print system 1 is installed. Furthermore, FIG. 19 is a diagram showing a system configuration according to this fourth embodiment. FIG. 20 is a functional block diagram of an entry/exit managing server 40.

As shown in FIG. 19, in a print system 1D according to the fourth embodiment, the entry/exit managing server (also referred to as a "room entry/exit managing server") 40 that manages entry/exit (room entry/exit) of the users is further provided. The entry/exit managing server 40 (more particularly, a room entry/exit recording unit 43 (see FIG. 20)) manages the entry/exit information about each of the users with respect to the room (an entry/exit time of each of the users, a number of an entry door of each of the users and the like). The entry/exit of each of the users need only be managed, for example, by an entry/exit recorder arranged in the vicinity of each of the doors or the like.

As shown in FIG. 18, the MFPs 10a to 10d are installed near the door DR1, the MFPs 10e and 10f are installed near the door DR2, and the MFP 10g is installed near the door DR3.

The data table TB4 shown in FIG. 17 is a data table generated previously with the positional relationships as shown in FIG. 18 reflected thereon. The data table TB4 is stored, for example, in the entry/exit managing server 40.

Here, the situation is assumed, where when the print jobs (authentication printing jobs) by the plurality of users UA, UB, UC and UD are subjected to spooling in the print server 50, the user UA is performing the authentication printing output of his or her own print job JBa, using the MFP 10a. In this situation, operation similar to that of the first embodiment is performed.

However, in step S15, the MFP 10a performing the authentication printing output transmits the notification message MS only to the user satisfying a condition 4 as described below among the users UB, UC and UD excluding the user UA performing the authentication printing output from all the requesting users UA, UB, UC and UD of the authentication printing jobs. Here, as the condition C4, a condition that the notification-destination user is the user who has entered the room through the door nearest the operating MFP 10 (the MFP 10 in the non-sleep state) is employed. For example, on condition that one of the users is determined to have entered the room through the door DR1 nearest the MFP 10a among the plurality of doors DR1 to DR3 in the room, the MFP 10a decides the relevant user as the notification-destination user to transmit the notification message MS.

The entry/exit managing server 40 (particularly, the notification-destination selecting unit 45 (FIG. 20) selects the notification-destination user, based on the condition C4 in step S14. For example, when the user UB is determined to have entered the room through the door DR1, but have not exited, based on an entry/exit record, the entry/exit managing server 40 determines that the user UB is the user who has entered the room through the door nearest the MFP 10a, based on the data table TB4. A determination result thereof is transmitted to the MFP 10a from the entry/exit managing server 40. The MFP 10a transmits the notification message MS to the user UB, based on the determination result.

Similarly, for the other users UC, UD, UE and the like, whether or not they are the users who have entered the room through the door DR1 nearest the operating MFP 10a is also determined. Based on determination results thereof, the notification destinations of the notification message MS are decided.

For example, a case is assumed, where the users UB and UD entered the room through the door DR1, the user UC entered the room through the door DR2, and only the user UD has already exited. In this case, as the notification destination of the notification message MS by the MFP 10a, only the user UB is selected, based on the condition C4. The users UC and UD are excluded from the notification destination of the notification message MS by the MFP 10a. Similarly, as the notification destination of the notification message MS by the MFP 10e, only the user UC is selected. Hereinafter, the users UB and UD are excluded from the notification destination of the notification message MS by the MFP 100.

Hereinafter, operation similar to that of the first embodiment will be performed.

This aspect is allowed to produce advantageous effects similar to those of the first embodiment.

According to the above-described aspect, the MFP 10a performing authentication printing output (the MFP 10a in the non-sleep state) transmits the notification message MS only to the user satisfying the above-described condition C4 among all the users UB, UC and UD other than the user UA performing the authentication printing output. Accordingly, the notification message MS can be transmitted only to the notification destination properly narrowed down. Particularly, from one of the MFP 10i, the notification message MS can be efficiently transmitted to the user who has entered the room through the nearest door DR (eventually, the user having a high possibility of existing in the vicinity of the MFP 10i). In other words, frequent useless notification of the notification message MS to the respective users can be suppressed.

<5. Fifth Embodiment>

While in the above-described first to fourth embodiments, the aspect in which the present invention is applied to the case where the "authentication printing" is performed in the print system has been described, in this fifth embodiment, an aspect in which the present invention is applied to a case where "non-authentication printing" is performed in the print system will be described. The fifth embodiment is a modification of the first embodiment. Hereinafter, a description will be made while focusing on different points from the first embodiment.

A print system 1E according to the fifth embodiment includes a configuration similar to that of the print system 1A according to the first embodiment.

However, in the print system 1E, the above-described notification message MS is transmitted to the proper user in the normal printing operation in place of the authentication printing.

Figure 21:
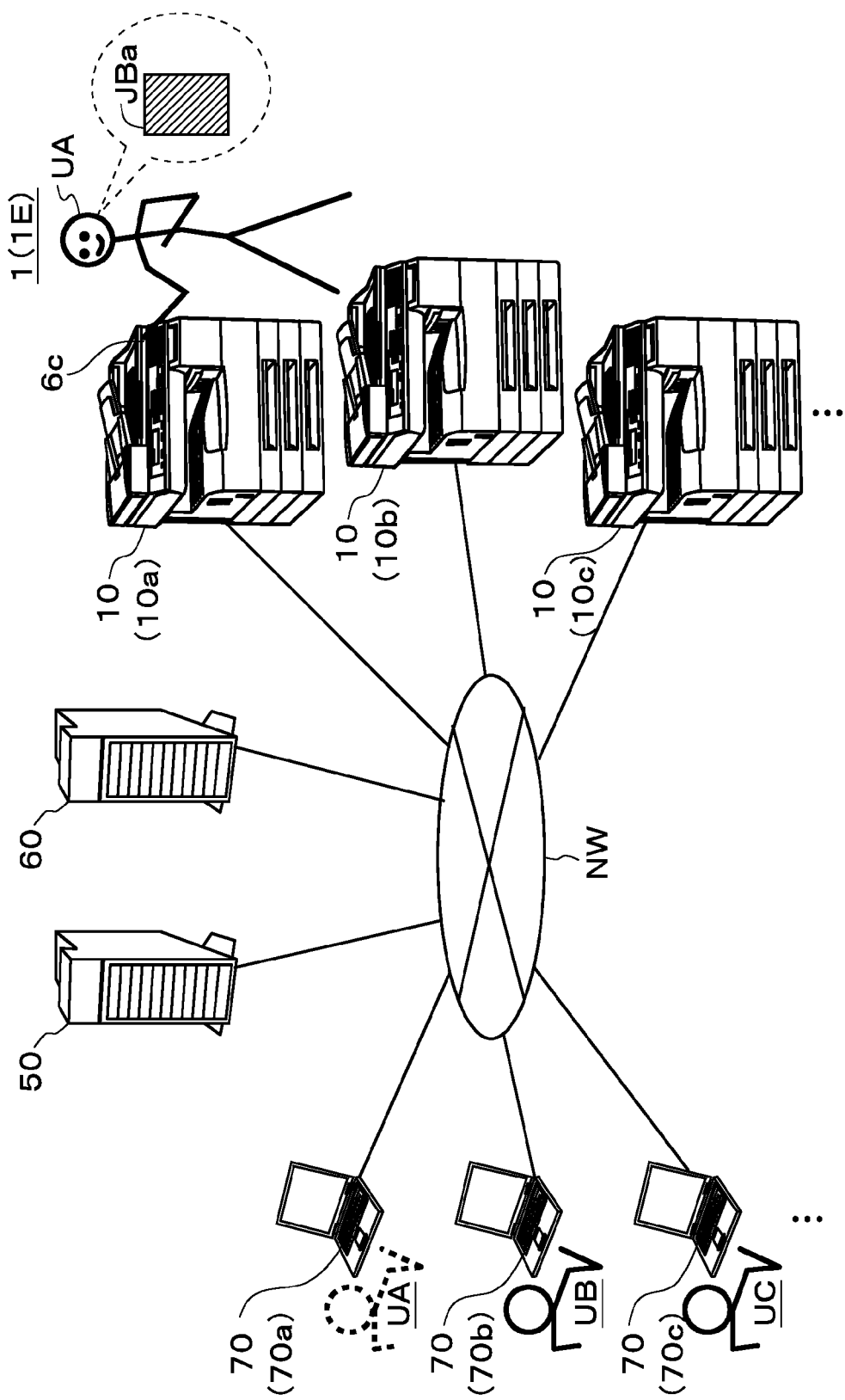
FIG. 21 is a diagram showing operation in a print system according to a fifth embodiment.
Figure 22:
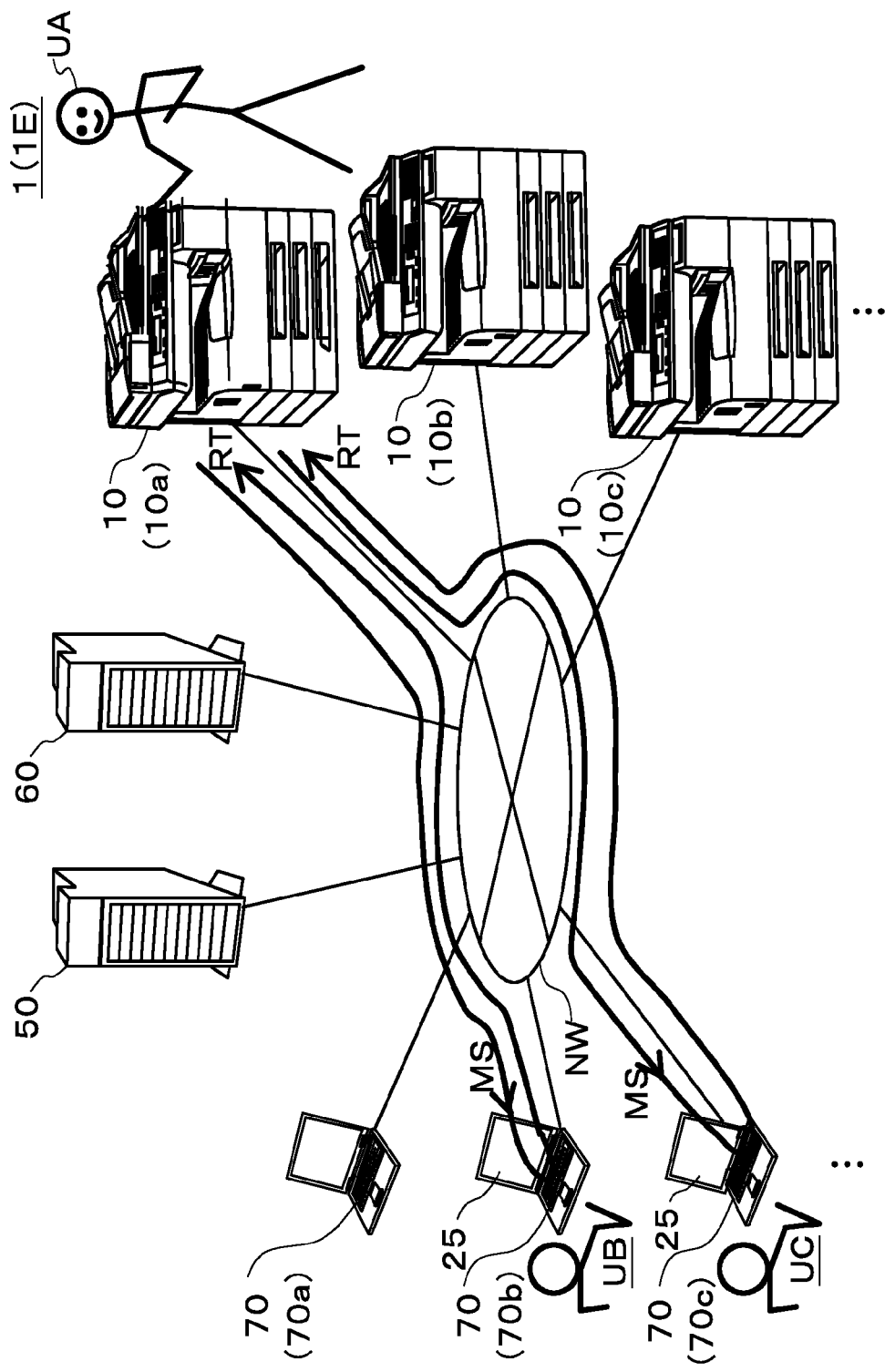
FIG. 22 is a diagram showing the operation in the print system according to the fifth embodiment.
Figure 23:
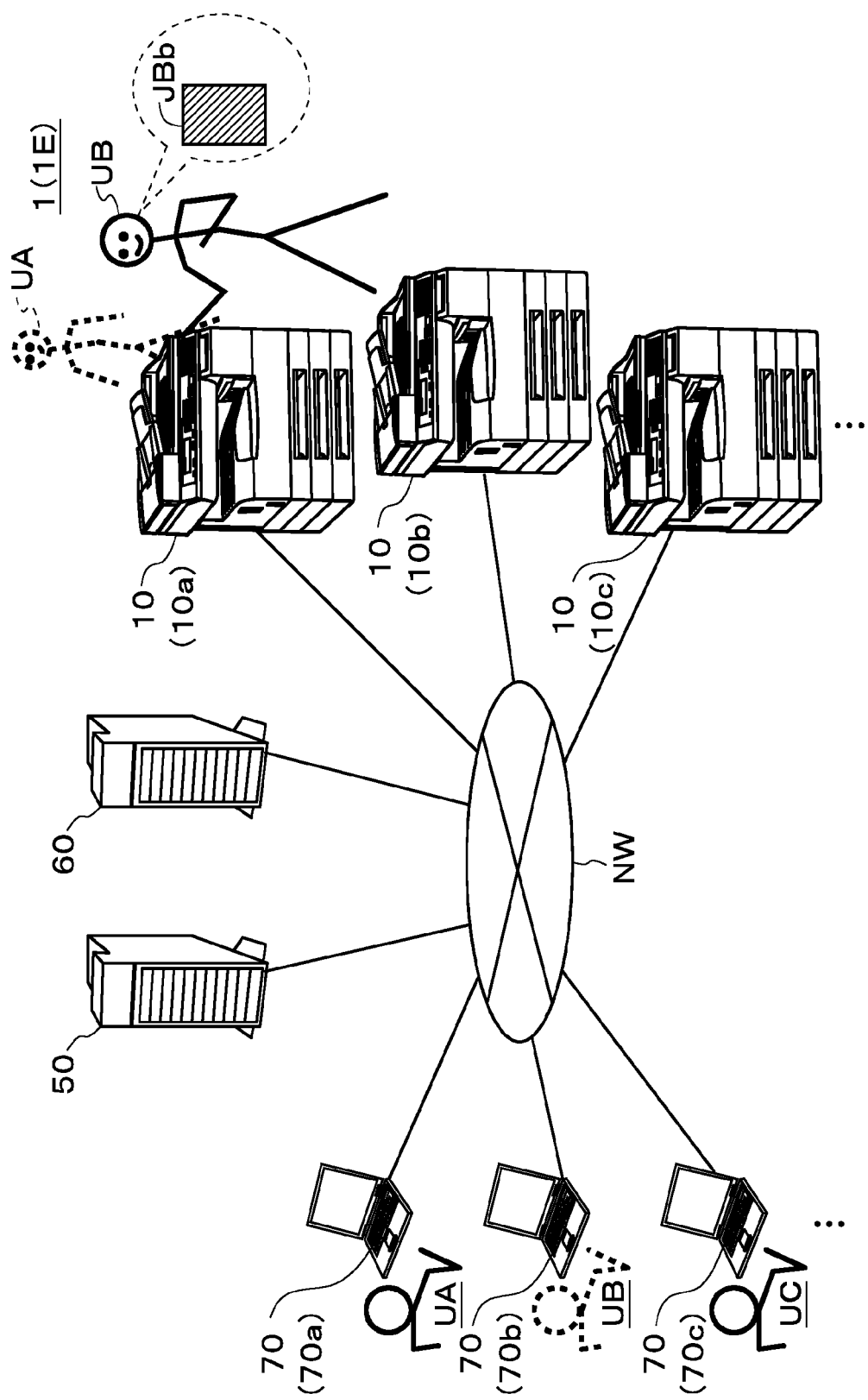
FIG. 23 is a diagram showing the operation in the print system according to the fifth embodiment.

Operation in this system 1E will be described with reference to FIGS. 21 to 24 and the like. FIGS. 21 to 23 are diagrams sequentially showing a flow of the data and the like in the system 1E, and FIG. 24 is a flowchart showing a part of operation.

First, as shown in FIG. 21, the user UA moves to the placing place of the MFP 10a. The user UA inputs the authentication information Da2, using the operation panel 6c of the MFP 10a to start the authentication operation (step S31 (see FIG. 24)). In the case where the MFP 10a has shifted to the sleep state (sleep mode), return processing from the sleep state to the steady state (normal mode) is also performed.

Figure 24:
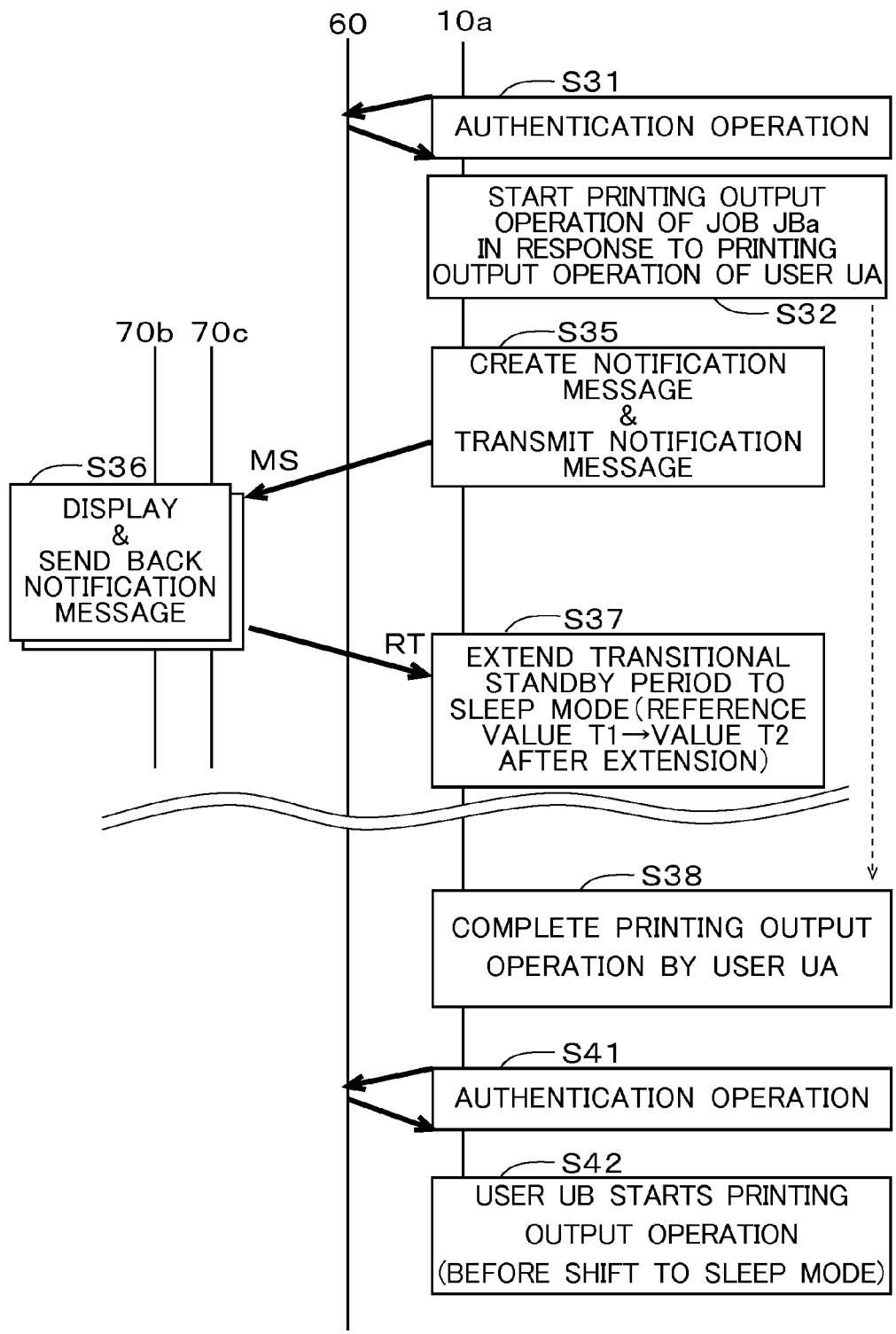
FIG. 24 is a flowchart showing a part of the operation according to the fifth embodiment.

The MFP 10a transmits the inputted authentication information Da2 to the authentication server 60 together with the authentication processing request data (see FIG. 24). When the authentication information Da2 and the like are received by the authentication request receiving unit 61a of the authentication server 60, the authentication processing unit 63 of the authentication server 60 checks the inputted authentication information Da2 against the legitimate authentication information Da1 to execute the authentication processing. When the inputted authentication information Da2 is determined to match with the legitimate authentication information Da1, the authentication server 60 (particularly, the authentication result transmitting unit 61b) transmits "authentication success" to the MFP 10a. When the inputted authentication information Da2 is determined to not match with the legitimate authentication information Da1, the authentication server 60 (the authentication result transmitting unit 61b) transmits "authentication failure" to the MFP 10a.

The MFP 10a permits the normal printing output operation and the like by the user UA only at the time of "authentication success".

At the time of "authentication success", the user UA subsequently performs the printing output operation (copy operation, box printing operation or the like), using the MFP 10a. The MFP 10a starts the printing output operation regarding the print job JBa of the user UA in accordance with the printing output operation by the user UA (step S32 (FIG. 24)).

Next, in step S35, the notification unit 12 of the MFP 10a decides the notification destinations of the notification message MS, and creates the notification message MS to transmit the notification message MS to the notification destinations (also see FIG. 22).

Particularly, the MFP 10a decides all the users (all registered users in the system 1E) as the notification destinations in this embodiment. However, here, the user UA under log-in (under printing operation) to the MFP 10a is excluded from the notification-destination users. Specifically, the notification unit 12 of the MFP 10a decides the users UB and UC other than the user UA as the notification-destination users.

The notification unit 12 of the MFP 10a transmits the notification message MS created as in the first embodiment to the communication destinations regarding the decided notification-destination users UB and UC (e.g., the respective electronic mail addresses of the users UB and UC) (FIG. 22).

The client 70b of the user UB receives the notification message MS at the electronic mail address of the user UB, and displays the details of the notification message MS on the display unit 25 of the client 70b (step S36). Similarly, the client 70c of the user UC receives the notification message MS at the electronic mail address of the user UC, and displays the details of the notification message MS on the display unit 25 of the client 70c.

In this manner, the MFP 10a transmits the notification message MS to the different users UB and UC in the non-sleep period (particularly, the authentication printing output period by the user UA) of the MFP 10a.

The user UB, visually checking the notification message MS, decides whether or not to perform a new print job, using the currently operating MFP 10a. When the user UB decides to perform his or her own new print job continuously after the end of the print job currently being performed, using the MFP 10a, he or she sends back the instruction RT containing that effect. For example, the reply mail to the effect that "the concurrent printing output is scheduled" in the predetermined form is transmitted as the instruction RT from the client 70b to the MFP 10a.

For the other user UC as well, similar operation is performed.

When the MFP 10a receives the reply mail from the users UB, UC, and recognizes that "at least one of the user UB and the user UC is intended to perform the concurrent printing output", the MFP 10*a* sets the transition standby period SB for transition of the MFP 10*a* to the sleep mode at the relatively long period t2 (e.g., several minutes) in place of the relatively short period t1 (e.g., zero to several seconds) (step S37). In other words, the MFP 10*a* extends the transition standby period SB from the value t1 to the value t2.

Thereafter, the print job JBa of the user UA ends (step S38 (the time T18)).

Furthermore, the user UB moves to the placing place of the MFP 10*a* around the time when the printing end of the print job JBa by the user UA to perform the printing output operation of his or her own new print job JBb (see FIG. 23). This allows the user UB to obtain an printing output object of the new print job JBb.

At this time, if the transition standby period SB for transition of the MFP 10*a* is extended, the user UB can print out the new print job JBb, subsequently to the print job JBa of the user UA, using the MFP 10*a* in the operation period of the MFP 10*a* (in the extended operation period) (before the MFP 10*a* shifts to the sleep mode). Accordingly, the user UB can obtain the authentication printing output by the MFP 10*a* without waiting for the return from the sleep mode. That is, the waiting time of the user UB can be reduced.

Although the output of the printing job JBa of the user UA is completed (or a predetermined period has passed since the notification message transmission in step S35), the reply mails from the notification-destination users (the users UB and UC) are not received, the MFP 10*a* determines "the concurrent printing output by the users UB and UC will not be performed", and does not extend the transition standby period SB. The MFP 10*a*, as in a principle, shifts to the sleep mode immediately after the standby period t1 has passed since the end point of the print job JBa.

As described above, in the fifth embodiment, in the non-sleep period associated with the printing output of the print job JBa of the MFP 10*a*, the inquiry about whether the concurrent printing output that the new printing output is performed subsequently to the printing output of the print job JBa is sent to the registered users UB and UC. When the reply for informing that the concurrent printing output is scheduled is sent from the user, the transition standby period for transition of the MFP 10*a* to the sleep mode is extended to the relatively large second value t2. Thus, before the MFP 10*a* shifts to the sleep mode, the new printing output using the MFP 10*a* can be performed. Accordingly, the user UB (and/or the user UC) can obtain the new printing output without waiting for the return from the sleep mode, and the waiting time of the user can be reduced.

While in the fifth embodiment, the case is exemplified, where among the users UA, UB and UC, which are the registered users, the user UA corresponding to the print job JBa being performed is excluded from the notification destinations of the notification message MS, the present invention is not limited thereto. For example, the notification message MS may be sent to the users UA, UB and UC, which are all the registered users, without excluding the user UA performing the printing. Alternatively, the notification message MS may be sent to all or some of users desiring the notification of the notification message MS (notification desiring users).

Moreover, while in this fifth embodiment, the case where the authentication processing and the like are performed, using the authentication server 60 is exemplified, the present invention is not limited thereto. An authentication processing unit may be provided inside the MFP 10 in place of the use of the authentication server 60.

Alternatively, the present invention may be applied to a case where the authentication processing itself is not performed. In this case, for example, the notification message MS only need be sent to all the registered users without excluding the user UA performing the printing from the notification destination. Alternatively, the notification message MS may be sent only to the user whose use frequency of the MFP 10*a* is equal to or higher than the threshold value, among all the registered users.

Moreover, while in the above-described fifth embodiment, the case is exemplified where the operating user moves to the placing place of the MFP 10 to log in the MFP 10, the present invention is not limited thereto. For example, the above-described idea may be applied to a case where each of the users transmits the desired printing data to the MFP 10 through the network to cause the MFP 10 to perform the printing output, based on the printing data. That is, the above-described idea may be applied to network printing.

Moreover, modifications similar to those in the second embodiment and the like can be made to the fifth embodiment and the like.

For example, among the registered users UA, UB, UC, . . . of the system, the users whose use frequencies of the MFP 10*a* are equal to or higher than the predetermined threshold value (e.g., UB, UD and the like) may be decided as the notification-destination users of the notification message MS.

Alternatively, on condition that the apparatus whose use frequency is the highest among the plurality of MFPs 10 in the print system (also referred to as a highest use frequency apparatus) in terms of one of the registered users UA, UB and UC of the system is the MFP 10*a* (the object apparatus of the concurrent printing output), the notification message MS may be sent to the relevant user. In other words, on condition that the use frequency of the MFP 10*a* by the specific user is determined as the highest one of the use frequencies the plurality of MFPs 10 by the specific user, the notification message MS may be sent to the specific user.

Alternatively, the user UB who has entered the room through the door DR1 nearest the MFP 10*a* (the object apparatus of the concurrent printing output) among the plurality of doors in the room may be decided as the notification-destination user.

<6. Others>

While the embodiments of this invention have been described above, the present invention is not limited to those described above.

For example, while in the above-described embodiments, the notification by the electronic mail is exemplified, the present invention is not limited thereto, but the notification message MS may be transmitted and received, using software (Messenger) that gives and receives the message through the network NW. Alternatively, the notification message MS may be given and received by dedicated application software. As the information M1 regarding the notification-destination user, the IP address and the like of the client 70 corresponding the notification-destination user need only be transmitted and received.

Moreover, while in the above-described embodiments, the case where the notification message MS is transmitted by the MFP 10 is exemplified, the present invention is not limited thereto. For example, the notification message MS may be transmitted to the notification-destination user by the print server 50.

While in the above-described embodiments, the case where the respective data tables TB2, TB3 and TB4 are stored in the print server 50 is exemplified, the present invention is not limited thereto, but the respective data tables TB2, TB3 and TB4 may be stored in the respective MFPs 10i.

Moreover, while in the above-described embodiments, the case where the authentication operation associated with the input of the authentication ID is performed is exemplified, the present invention is not limited thereto. For example, the authentication operation utilizing a card for authentication may be performed. Alternatively, the authentication operation by biometric authentication may be performed.

Moreover, while in the above-described embodiments, the MFP is exemplified as the image forming apparatus (printing apparatus), the present invention is not limited thereto. For example, the image forming apparatus may be a single-function printer or the like.

Moreover, while in the above-described embodiments, the case where the print server 50 is provided separately from the MFP 10 is exemplified, the present invention is not limited thereto. For example, the MFP 10 may perform a function similar to the function of the print server 50. Particularly, the MFP 10 may have a storage unit equivalent to the printing data storage unit 53, and a notification-destination selecting unit equivalent to the notification-destination selecting unit 55.

Similarly, the MFP 10 may perform a similar function to the function of the authentication server 60.

While in the above-described first embodiment and the like, the case is exemplified where the printing output completion timing is calculated, based on the print job JBa, and the transition standby period is extended in accordance with the calculated value, the present invention is not limited thereto. For example, as an extended period t3 (=t2−T1), a constant value decided previously (e.g., "five minutes") may be used.

Alternatively, the extended period t3 may be arbitrarily set by specification of the user. For example, the value t2 (designated period) regarding the transition standby period SB after the extension may be designated by the user UB in the response instruction RT to the notification message MS to set the transition standby period SB after the extension, based on the value t2.

While the invention has been shown and described in detail, the foregoing description is in all aspects illustrative and not restrictive. It is therefore understood that numerous modifications and variations can be devised without departing from the scope of the invention.

What is claimed is:

1. An image forming apparatus comprising:
a notification part for providing, to a user, a notification of an inquiry about whether concurrent printing output that the image forming apparatus performs first printing output and subsequently performs second printing output is scheduled, in a non-sleep period associated with the first printing output by the image forming apparatus; and
a setting part for setting a transition standby period for transition of the image forming apparatus to a sleep state at a first value when a reply for informing that the concurrent printing output is scheduled is not sent from the user, and setting the transition standby period at a second value which is larger than the first value when the reply is sent from the user;
wherein:
in the non-sleep period associated with the first printing output by a first user, the notification part provides the notification to a second user;
the first printing output is authentication printing output by the first user;
the notification part decides as the second user a requesting user who requests an authentication printing job under spooling;
the image forming apparatus further comprising:
an analysis part for analyzing a printing job type regarding the authentication printing job under spooling by the requesting user; and
a designation part for previously designating an output apparatus for each of the users in accordance with the printing job type, wherein
on condition that the image forming apparatus is an output apparatus designated previously by the requesting user in accordance with the printing job type, the notification part provides the notification to the requesting user.

2. The image forming apparatus according to claim 1, wherein
when the authentication printing job by the requesting user is a monochrome printing job, on condition that the image forming apparatus is an output apparatus designated by the requesting user in response to the monochrome printing job, the notification part provides the notification to the requesting user, and
when the authentication printing job by the requesting user is a color printing job, on condition that the image forming apparatus is an output apparatus designated by the requesting user in response to the color printing job, the notification part provides the notification to the requesting user.

3. A print system including the image forming apparatus of claim 1 and a plurality of client computers connected to the image forming apparatus through a network.

4. An image forming apparatus comprising:
a notification part for providing, to a user, a notification of an inquiry about whether concurrent printing output that the image forming apparatus performs first printing output and subsequently performs second printing output is scheduled, in a non-sleep period associated with the first printing output by the image forming apparatus; and
a setting part for setting a transition standby period for transition of the image forming apparatus to a sleep state at a first value when a reply for informing that the concurrent printing output is scheduled is not sent from the user, and setting the transition standby period at a second value which is larger than the first value when the reply is sent from the user;
wherein in the non-sleep period associated with the first printing output by a first user, the notification part provides the notification to a second user;
the image forming apparatus further comprising:
a calculation part for calculating an estimated time of completion of the first printing output, wherein
the notification part notifies the second user of the estimated time of completion calculated by the calculation part, and inquires of the second user as to whether the concurrent printing output is scheduled.

5. A print system including the image forming apparatus of claim 4 and a plurality of client computers connected to the image forming apparatus through a network.

6. An image forming apparatus comprising:
notification part for providing, to a user, a notification of an inquiry about whether concurrent printing output that the image forming apparatus performs first printing output and subsequently performs second printing output is scheduled, in a non-sleep period associated with the first printing output; and
setting part for setting a transition standby period for transition of the image forming apparatus to a sleep state at a first value when a reply for informing that the concurrent printing output is scheduled is not sent from the user, and setting the transition standby period at a second value which is larger than the first value when the reply is sent from the user;

wherein the setting part sets the second value so as to satisfy a condition that a power consumption amount in the transition standby period after extension associated with extension of the transition standby period is equal to or smaller than the power consumption amount at the time of return from the sleep state.

7. A print system including the image forming apparatus of claim 6 and a plurality of client computers connected to the image forming apparatus through a network.

8. An image forming apparatus being enable to connect to a plurality of client computer through network comprising:

notification part for providing, to a client computer corresponding to a second user different from first user, a notification of an inquiry about whether concurrent printing output that the image forming apparatus subsequently performs second printing output after a finish of first printing output of the first user carried on is scheduled, in a period that is after a start of the first printing output and before a finish of the first printing output; and setting part for setting a transition standby period for transition of the image forming apparatus to a sleep state at a first value when a reply for informing that the concurrent printing output is scheduled is not sent from the computer corresponding to the second user, and setting the transition standby period at a second value which is larger than the first value when the reply is sent from the user.

9. The image forming apparatus according to claim 8, further comprising designation part for previously designating an output apparatus for each of the users, wherein on condition that the image forming apparatus is the output apparatus designated by the requesting user, the notification part provides the notification to the requesting user.

10. The image forming apparatus according to claim 8, wherein the first printing output is authentication printing output by the first user.

11. The image forming apparatus according to claim 8, wherein the notification part decides as the second user a user whose use frequency of the image forming apparatus is equal to or higher than a predetermined threshold value.

12. The image forming apparatus according to claim 8, wherein on condition that a use frequency of the image forming apparatus by a specific user is determined as the highest one of use frequencies of a plurality of image forming apparatuses by the specific user in a print system, the notification part provides the notification to the specific user.

13. The image forming apparatus according to claim 8, further comprising:

an entry/exit management part for managing room entry/exit information about each of the users with respect to a room where a plurality of image forming apparatuses in a print system are installed, wherein the notification part decides as the second user a user who has entered the room through a predetermined door nearest the image forming apparatus among a plurality of doors in the room.

14. A print system including the image forming apparatus of claim 8 and a plurality of client computers connected to the image forming apparatus through a network.

* * * * *